US010427786B2

(12) United States Patent
Shaw et al.

(10) Patent No.: US 10,427,786 B2
(45) Date of Patent: Oct. 1, 2019

(54) DRONE AUTHENTICATION SYSTEM

(71) Applicant: AT&T Intellectual Property I, L.P., Atlanta, GA (US)

(72) Inventors: Venson Shaw, Kirkland, WA (US); Sangar Dowlatkhah, Alpharetta, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 188 days.

(21) Appl. No.: 15/704,548

(22) Filed: Sep. 14, 2017

(65) Prior Publication Data
US 2019/0077506 A1 Mar. 14, 2019

(51) Int. Cl.
*B64C 39/02* (2006.01)
*G08G 5/00* (2006.01)
*G05D 1/00* (2006.01)
*G06Q 20/40* (2012.01)
*G06F 21/00* (2013.01)
*G06Q 50/30* (2012.01)

(52) U.S. Cl.
CPC ......... *B64C 39/024* (2013.01); *G05D 1/0088* (2013.01); *G05D 1/0094* (2013.01); *G06F 21/00* (2013.01); *G06Q 20/40145* (2013.01); *G06Q 50/30* (2013.01); *G08G 5/006* (2013.01); *G08G 5/0013* (2013.01); *G08G 5/0026* (2013.01); *G08G 5/0069* (2013.01); *B64C 2201/126* (2013.01); *B64C 2201/128* (2013.01)

(58) Field of Classification Search
CPC ............ B64C 39/024; B64C 2201/128; B64C 2201/126; G08G 5/0069; G05D 1/0094; G05D 1/0088; G06Q 20/40145
See application file for complete search history.

(56) References Cited

U.S. PATENT DOCUMENTS

| 8,572,707 | B2 * | 10/2013 | Tuchman | H04L 9/3226 |
| | | | | 713/168 |
| 9,051,043 | B1 | 6/2015 | Peeters et al. | |
| 9,307,383 | B1 | 4/2016 | Patrick | |
| 9,359,074 | B2 | 6/2016 | Ganesh et al. | |
| 9,409,646 | B2 | 8/2016 | Fleck | |

(Continued)

FOREIGN PATENT DOCUMENTS

CN 106529500 A 3/2017

*Primary Examiner* — Ramsey Refai
(74) *Attorney, Agent, or Firm* — Haynes and Boone, LLP

(57) ABSTRACT

Systems and methods for authenticating a user include monitoring a monitored space for a condition to provide an interaction between a drone and an individual. In response to the condition to provide the interaction between the drone and the individual being satisfied, the drone may obtain a first set of sensor data corresponding to the individual. The first set of sensor data may indicate that the individual requires a service that requires authentication of the individual as a user of the service and that the individual is unable to provide a primary authentication response. The drone may then obtain a second set of sensor data corresponding to the individual unable to provide the primary authentication response. The drone authentication system then determines, based on the second set of sensor data and identity data that the individual corresponds to identity data of a user of the service and performs the service.

20 Claims, 12 Drawing Sheets

(56) References Cited

U.S. PATENT DOCUMENTS

| | | |
|---|---|---|
| 9,417,325 B1 | 8/2016 | Bry et al. |
| 9,471,059 B1 | 10/2016 | Wilkins |
| 9,646,283 B2 | 5/2017 | Kantor et al. |
| 9,663,227 B1 | 5/2017 | Lema et al. |
| 9,875,592 B1 * | 1/2018 | Erickson ............ G07C 9/00309 |
| 2015/0179038 A1 | 6/2015 | Daniel et al. |
| 2016/0068264 A1 * | 3/2016 | Ganesh ................ G08G 5/0069 701/2 |
| 2016/0239798 A1 | 8/2016 | Borley et al. |
| 2017/0053169 A1 | 2/2017 | Cuban et al. |
| 2017/0090484 A1 * | 3/2017 | Obaidi .................. B64C 39/024 |
| 2017/0092109 A1 | 3/2017 | Trundle et al. |
| 2017/0106976 A1 | 4/2017 | Kuhara |
| 2017/0124789 A1 | 5/2017 | Rephlo |
| 2017/0185731 A1 * | 6/2017 | Ranieri ............... G06F 19/3462 |
| 2017/0320569 A1 * | 11/2017 | Gordon ................ B64C 39/024 |
| 2018/0046179 A1 * | 2/2018 | Choi .................... B64C 39/024 |
| 2018/0144302 A1 * | 5/2018 | Murray ............ G06Q 10/08355 |

* cited by examiner

DRONE AUTHENTICATION SYSTEM

FIELD OF THE DISCLOSURE

This disclosure relates generally to drones, such as unmanned aerial vehicles, and, more particularly, to authentication of users with drones.

BACKGROUND

Drones, such as unmanned aerial vehicles (UAVs), are mobile platforms capable of acquiring (e.g., sensing) information, delivering goods, manipulating objects, etc., in many operating scenarios. Drones typically have the ability to travel to remote locations that are inaccessible to manned vehicles, locations that are dangerous to humans, or any other location. Upon reaching such locations, a suitably equipped drone may perform actions, such as acquiring sensor data (e.g., audio, images, video and/or other sensor data) at a target location, delivering goods (e.g., packages, medical supplies, food supplies, engineering materials, etc.) to the target location, manipulating objects (e.g., such as retrieving objects, operating equipment, repairing equipment etc.) at the target location, etc.

Drones are often controlled by a remote user from a command center (e.g., using a remote control, computer device, smart phone, and/or other remote monitor) such that the remote user provides commands to the drone through a wireless communications link to perform actions. More advanced drones are also being developed that are more autonomous (e.g., fully autonomous, semi-autonomous) such that drone guidance systems may assist the remote user or remove the need for the remote user altogether. These fully autonomous drones may be configured to follow an individual or group of individuals or monitor a location where individuals may be present. The drone may then provide services to these individuals, which may require the drone to authenticate the individual as a user of the drone and/or service using a primary authentication such as a verbal username and password. However, in certain situations the primary authentication may not be appropriate such as when the individual is with other people, the individual has a medical condition that prohibits the individual from providing the primary authentication, and/or the location of the individual is prohibitive.

SUMMARY

In some embodiments in accordance with the present disclosure, a drone authentication system for use in a monitored space is disclosed. The drone authentication system may include a plurality of sensors, that includes at least an imaging sensor. The drone authentication system also includes a drone that includes: at least one communications interface; at least one non-transitory memory storing identity data associated with one or more users; and one or more processors coupled to the plurality of sensors, communications interface, and non-transitory memory and configured to execute instructions to cause the authentication system to: monitor a monitored space for a condition to provide an interaction between a drone and an individual; obtain, in response to the condition to provide the interaction between the drone and the individual being satisfied, a first set of sensor data corresponding to the individual; determine the individual requires a service based on the first set of sensor data that requires authentication of the individual as a user of the service and, in response, determine, based on the first set of sensor data, that the individual is unable to provide a primary authentication response; obtain, by the drone, a second set of sensor data corresponding to the individual unable to provide the primary authentication response; and determine, based on the second set of sensor data and stored identity data, that the individual is a user of the service and, in response, perform the service.

In various embodiments of the drone authentication system, the drone authentication obtains the second set of sensor data corresponding to the individual unable to provide the primary authentication response in response to determining the identity of the individual is known and the service requires authentication of the individual regardless of whether the individual is already identified.

In various embodiments of the drone authentication system, the one or more processors are further configured to execute instructions to cause the authentication system to autonomously navigate the drone toward the individual in response to the condition to provide the interaction between the drone and the individual being satisfied; and initiate an investigate mode of the drone when the drone is within a predetermined range of the individual. Also, the primary authentication response is an acoustic credential to be obtained by an acoustic sensor included on the drone.

In various embodiments of the drone authentication system, the drone includes a biometric sensor coupled to the one or more processors, and the one or more processors are further configured to execute instructions to cause the authentication system to: deploy the biometric sensor, and the second set of sensor data includes sensor data obtained by the biometric sensor. In some embodiments, the first set of sensor data does not include sensor data obtained by the biometric sensor.

In various embodiments of the drone authentication system, the one or more processors is further configured to execute instructions to cause the authentication system to determine, based on image sensor data captured by an image sensor and included in the first set of sensor data, one or more sensors of the plurality of sensors for use in obtaining the second set of sensor data corresponding to the individual.

Figure 1:
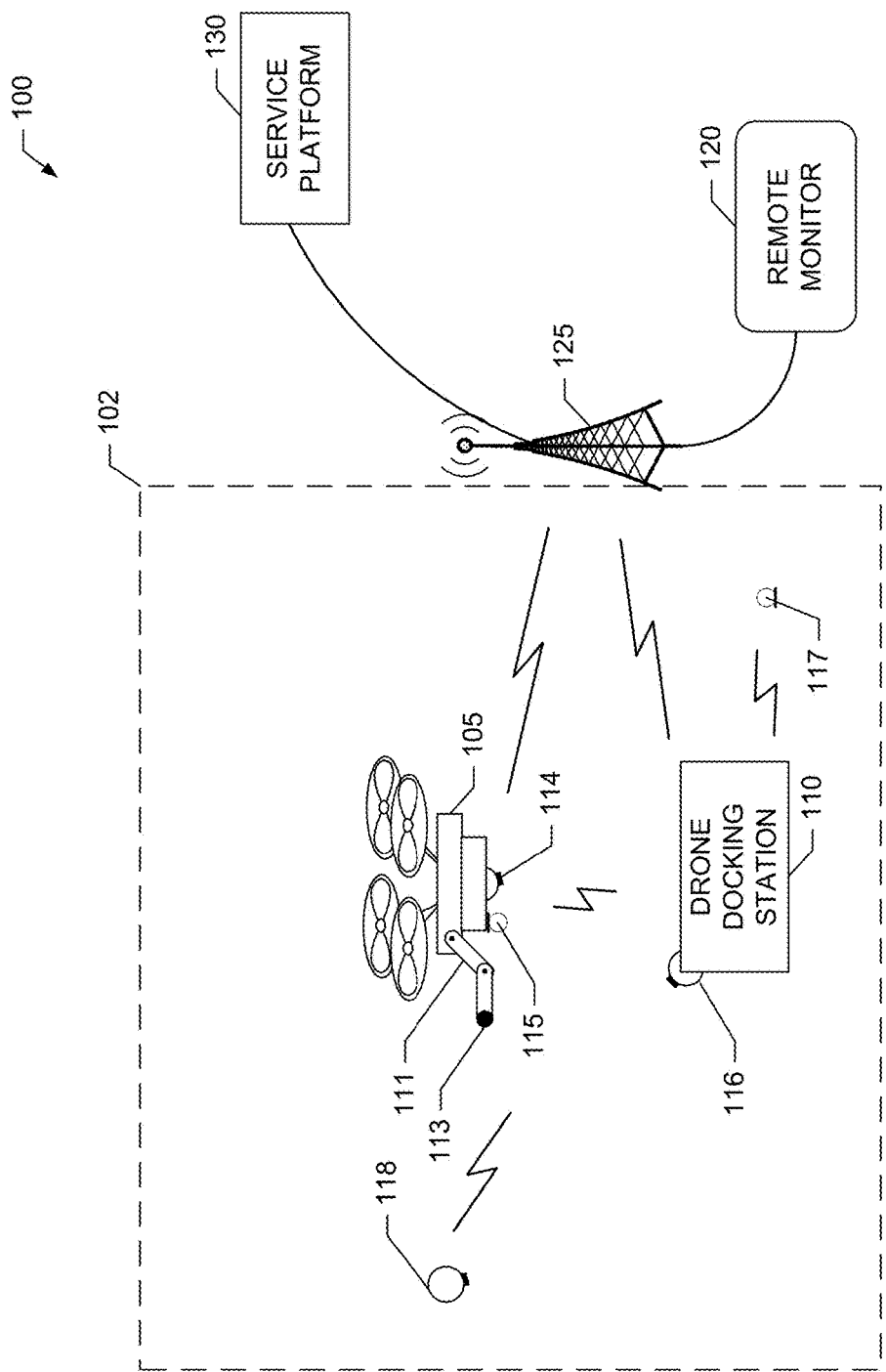
FIG. 1 is a schematic view illustrating an embodiment of a drone authentication system.

Embodiments of the present disclosure may be understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include drone authentication systems and methods that may be used, for example, to authenticate an individual as an authenticated user of a drone and/or service provided by the drone. As discussed above, some autonomous drones need to authenticate an individual as a user of the drone and/or service provided by the drone. A primary authentication response may include an individual providing credentials to the drone via a password or passphrase. Some issues with autonomous drones are that autonomous features such as authentication of an individual as a user is not always reliable, is insufficient, and/or unavailable in numerous situations. For example, monitored spaces that are public or that include more than one individual lack privacy, the individual may have a health issue (e.g., post-surgery, Alzheimer's, dementia, a temporary memory blank, unconsciousness, trauma, shock, etc.) that prevents the user from memorizing and/or providing an authentication response, the monitored space may be a restricted space requiring extra authentication, the individual may be determined to be suspicious, the position of the individual in the monitored space may be inaccessible to the drone to obtain the primary authentication response, and/or other situations. Therefore, it may be beneficial for a drone to be configured to authenticate an individual using one or more of a plurality of authentication techniques and determining which authentication response is appropriate given the user, conditions of the user, and other conditions within the monitored space.

The systems and methods of the present disclosure provide for a drone authentication system that includes a drone that can be dispatched and autonomously navigated to investigate an individual within the monitored space when a condition exists to do so. Once the drone is within a predefined range of the individual and/or while the drone is in-flight toward the individual, the drone may determine whether the individual requires a service based on the conditions within the monitored space and the individual. In response to determining that the individual requires a service and that the service requires an authentication response from the individual to authenticate the individual as a user of the drone authentication system and/or service, the drone authentication system may determine whether a primary authentication response can be obtained from the individual. If the primary authentication response cannot be obtained from the individual, the drone authentication system determines one or more secondary authentication responses that can be obtained to authenticate the individual as an authenticated user of the drone and/or service provided by the drone. The drone authentication system may then determine whether the individual is an authenticated user of the drone and/or service and perform the service in response to the individual being an authenticated user.

Referring now to FIG. 1, an embodiment of a drone authentication system 100 is illustrated. In the illustrated embodiment, the drone authentication system 100 includes a drone 105 provided in a monitored space 102. The monitored space 102 may be any indoor and/or outdoor or outside space that may be contiguous or non-contiguous. The monitored space 102 may be defined by geofencing techniques that may include specific geographic coordinates such as latitude, longitude, and/or altitude, and/or operate within a range defined by a wireless communication signal.

The drone 105 may be implemented by any type of drone, such as an unmanned aerial vehicle (UAV). In alternative embodiments, a robot, an unmanned vehicular device (e.g., land or water), and/or other vehicular device may be employed. In the illustrated examples of the present disclosure, the drone 105 is depicted as a UAV and includes a flight control unit and a payload unit. For example, the flight control unit of the drone 105 includes any appropriate avionics, control actuators, and/or other equipment to fly the drone. The payload unit of the drone 105 includes any equipment implementing features supported by the given drone. For example, the payload unit may include one or more sensors, such as one or more cameras and/or other imaging sensors 114, one or more environmental sensors (e.g., such as one or more temperature sensors, pressure sensors, humidity sensors, gas sensors, altitude sensors, location sensors and the like) and/or any other sensor. In the illustrated embodiment, the drone 105 may include an acoustic sensor 115 (e.g., a microphone, a microphone array, a directionally-discriminating acoustic sensor/transducer, and other acoustic sensors for detecting acoustic energy). Additionally or alternatively, an example payload unit for the drone 105 may include tools, actuators, manipulators, etc., capable of manipulating (e.g., touching, grasping, delivering, measuring, etc.) objects. For example, as illustrated in FIG. 1, the drone may include a robotic arm 111 that is configured to deploy the one or more sensors include on the robotic arm 111. For example, the one or more sensors included on the robotic arm 111 may include one or more sensors discussed above and/or a biometric sensor 113. The biometric sensor 113 may include an ocular sensor (e.g., a retinal scanner, an iris scanner, and/or other ocular sensor), a fingerprint sensor, a blood type sensor, a DNA sensor, a temperature sensor, a blood pressure sensor, a heartbeat sensor, and/or other biometric sensors. Additionally or alternatively, an example payload unit for the drone 105 may include a portable base station, signal booster, signal repeater, etc., to provide network coverage to an area.

The drone authentication system 100 may optionally include or be used in connection with a drone docking station 110 for drone launching, landing, and/or storing the drone 105. The drone docking station 110 may be located anywhere in the monitored space 102 such as a rooftop, a yard, a vehicle, a room, or elsewhere. The drone docking station 110 may be connected to an external power grid and/or receive power from a local power source such as wind, solar, and/or thermal and store this power in one or more power supplies such as batteries. In certain embodiments, a battery of the drone 105 may be charged by the drone docking station 110 through a conduction pad and/or through an inductive charging device using the power of the drone docking station 110. The drone docking station 110 may include one or more sensors 116 such as one or more cameras and/or other imaging sensors, acoustic sensors, biometric sensors, one or more environmental sensors described above, and/or other sensors. Furthermore, the drone docking station 110 may include an autonomous docking guidance system for guiding the drone 105 to dock with the drone docking station 110. For example, the drone docking station 110 may include at least one visual indicator (e.g., lights, reflectors) and/or acoustic indicators that are recognizable by the drone 105 to assist the drone 105 in docking with the drone docking station 110.

The drone 105 and the drone docking station 110 may include communication units having one or more transceivers to enable the drone 105 to communicate with the drone docking station 110, one or more sensors 117 and 118 located in the monitored space 102, a remote monitor 120, a service platform 130, and/or to communicate among other drones. Accordingly, and as disclosed in further detail below, the remote monitor 120 may be in communication with the drone 105 directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the drone 105 and/or the drone docking station 110 in the drone authentication system 100 of FIG. 1 include first (e.g., long-range) transceiver(s) to permit the drone 105 and/or the drone docking station 110 to communicate with a communication network 125. The communication network 125 may be implemented by an example mobile cellular network, such as a long term evolution (LTE) network or other third generation (3G), fourth generation (4G) wireless network, or fifth-generation (5G) wireless network. However, in some examples, the communication network 125 may be additionally or alternatively be implemented by one or more other communication networks, such as, but not limited to, a satellite communication network, a microwave radio network, and/or other communication networks. In other examples, the drone docking station 110 may maintain a network connection through a wired (e.g., Ethernet) connection.

The drone 105 and the drone docking station 110 additionally or alternatively may include second (e.g., short-range) transceiver(s) to permit the drone 105 and/or the drone docking station 110 to communicate with each other, the sensors 117 and 118, other drones and/or other drone docking stations. In the illustrated example of FIG. 1, such second transceivers are implemented by a type of transceiver supporting short-range wireless networking. For example, such second transceivers may be implemented by Wi-Fi transceivers, Bluetooth® transceivers, infrared (IR) transceiver, and other transceivers that are configured to allow the drone 105 and/or the drone docking station 110 to intercommunicate via an ad-hoc or other wireless network.

The drone authentication system 100 also includes or may be used in connection with a remote monitor 120. The remote monitor 120 may be provided by a desktop computing system, a laptop/notebook computing system, a tablet computing system, a mobile phone, a set-top box, a remote control, a wearable device, and implantable device, and/or other remote monitor for controlling drones. The remote monitor 120 may be responsible for managing the drone 105 deployed in the monitored space 102. For example, the remote monitor 120 may communicate directly through the communication network 125 and/or indirectly through the drone docking station 110 to locate the drone 105 in the monitored space 102, identify the drone 105 in the monitored space 102, ascertain capabilities of the drone 105 in the monitored space 102, monitor the operating status of the drone 105 in the monitored space 102, receive sensor data provided by the drone 105 in the monitored space 102, provide instructions to the drone 105, and/or provide other functionality.

The drone authentication system 100 also includes or may be in connection with a service platform 130. For example, the service platform 130 may include one or more server devices, storage systems, cloud computing systems, and/or other computing devices (e.g., desktop computing device(s), laptop/notebook computing device(s), tablet computing device(s), mobile phone(s), etc.). As discussed below, the service platform 130 may be configured to provide repositories such a user repository of user profiles and a service repository of service profiles. For example, the user repository may include a plurality of user profiles that are associated with a user of the drone and/or a service that is accessible via the drone. The service repository may include a plurality of service profiles that the service platform monitors to determine whether a condition in the monitored space exists. Also, as discussed below, the service platform 130 may be configured to provide an authentication engine that authenticates that an individual is a user of the drone and/or service being accessed via the drone. The service platform may also include and services engine for communicating instruction to the drone 105 to provide a service.

Figure 2:
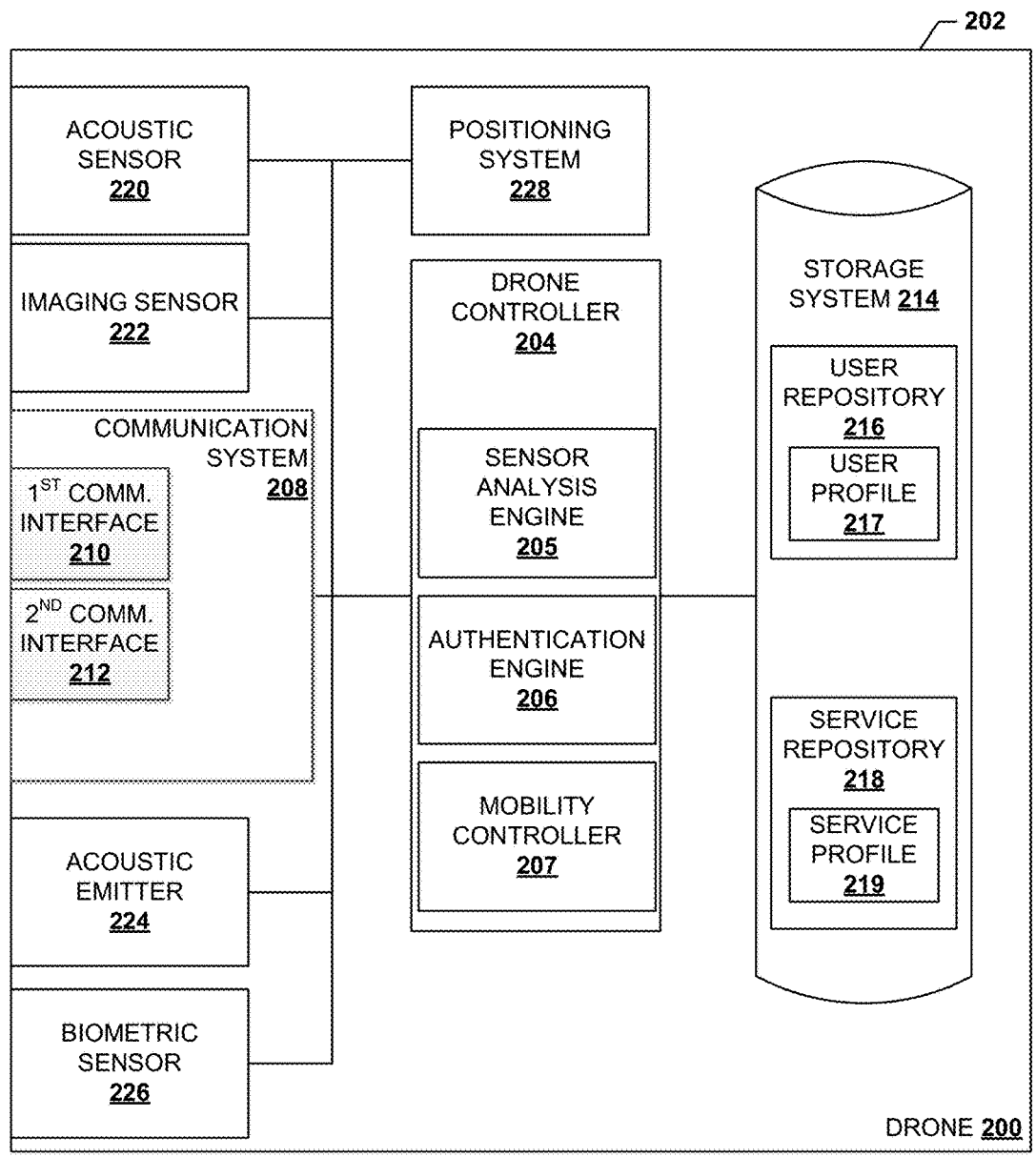
FIG. 2 is a schematic view illustrating an embodiment of a drone used in the drone authentication system of FIG. 1.

Referring now to FIG. 2, an embodiment of a drone 200 is illustrated that may be the drone 105 discussed above with reference to FIG. 1, and which may be provided by a UAV, a robot, an unmanned vehicular device (e.g., land or water), and/or other vehicular device. In the illustrated embodiment, the drone 200 includes a chassis 202 that houses the components of the drone 200. Several of these components are illustrated in FIG. 2. For example, the chassis 202 may house a processing system (not illustrated) and a non-transitory memory system (not illustrated) that includes instructions that, when executed by the processing system, cause the processing system to provide a drone controller 204 that is configured to perform the functions of the drone controllers and/or the drones discussed below. In the specific example illustrated in FIG. 2, the drone controller 204 is configured to provide a sensor analysis engine 205 that computationally processes sensor signals with stored sensor signal profiles, and an authentication engine 206 that performs a primary authentication and/or a secondary authentication of a user as well as the functionality discussed below. In the specific example illustrated in FIG. 2, the drone controller 204 is also configured to provide a mobility controller 207 to control the example flight control unit of drone 105 and to implement any control and feedback operations appropriate for interacting with avionics, control actuators, and/or other equipment included in the flight control unit to navigate the drone 105 illustrated in FIG. 1.

The chassis 202 may further house a communication system 208 that is coupled to the drone controller 204 (e.g., via a coupling between the communication system 208 and the processing system). The communication system 208 may include software or instructions that are stored on a computer-readable medium and that allow the drone 200 to send and receive information through the communication networks discussed above. For example, the communication system 208 may include a first communication interface 210 to provide for communications through the communication network 125 as detailed above (e.g., first (e.g., long-range) transceiver(s)). In an embodiment, the first communication interface 210 may be a wireless antenna that is configured to provide communications with IEEE 802.11 protocols (Wi-Fi), cellular communications, satellite communications, other microwave radio communications and/or communications. The communication system 208 may also include a second communication interface 212 that is configured to provide direct communication with other drones, the drone docking station 110, sensors 117 and 118, the remote monitor 120, and/other devices within the monitored space 102 discussed above with respect to FIG. 1 (e.g., second (e.g., short-range) transceiver(s)). For example, the second communication interface 212 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 202 may also house a storage system 214 that is coupled to the drone controller 204 through the processing system. The storage system 214 may store user profiles 217 in one or more user repositories 216. The user profiles 217 may include information associated with a user of the drone 200 and/or a service provided by the drone 200. For example, a user profile 217 may include a user identifier that is associated with the user. For example, the user identifier may include a username, a phone number, an electronic mail address, a user device identifier (e.g., a communication interface identifier of a mobile device) and/or other identifiers that can identify the user. Each user identifier may have user information associated with the user identifier that can be used by the drone 200 to undertake various services. For example, the user information may include preselected preferences, third party data, gathered data by the drone authentication system 100 over time, identity data such as sensor signal profiles (e.g., an acoustic profile, an image profile, a blood profile, a DNA profile, a fingerprint profile, an ocular profile and/or other sensor signal profile that can be used to identify the individual and be updated from gathered data over time using machine learning techniques discussed below), and/or any other data used for authenticating an individual as a user and providing services to that user. In addition, the storage system 214 may include a service repository 218 that includes a plurality of service profiles 219. The service repository 218 may include at least one application that provides instruction to the drone controller 204 when at least one condition is satisfied in a monitored space. In addition the at least one application may require that an individual in the monitored space to be authenticated as a user before providing the service. Each application may be associated with service profile 219 that includes sensor signal profiles of conditions that need to be satisfied before the application associated with that service profile 219 can be run on the drone controller 204.

The chassis 202 may also house an acoustic sensor 220 (e.g., a microphone, a microphone array, a directionally-discriminating acoustic sensor, or other acoustic sensors), an imaging sensor 222 (e.g., a two-dimensional image capturing camera, a three-dimensional image capturing camera, an infrared image capturing camera, a depth capturing camera, similar video recorders, and/or a variety of other image or data capturing devices), a biometric sensor 226 (an ocular sensor, a fingerprint sensor, a blood type sensor, a DNA sensor, a temperature sensor, a blood pressure sensor, a heartbeat sensor, and other biometric sensors) and in some embodiments, an acoustic emitter 224.

For example, the acoustic sensor 220 may include an microphone array that is configured to capture audio signals from acoustic energy in a monitored space and provide the audio signals to the sensor analysis engine 205 and/or authentication engine 206 to computationally process the audio signals against acoustic profiles associated with the user profiles 217 and/or service profiles 219 that are stored in the storage system 214 to determine whether substantial correspondence with any of the acoustic profiles exists. The acoustic sensor 220 may also be used to determine an apparent direction and/or location of the apparent source that provided the acoustic energy as discussed further below. Similarly, the acoustic emitter 224 may include a speaker array or other sound emitting device that generates and emits acoustic energy to the monitored space such that the acoustic energy is reflected off objects within the monitored space. Those objects then become apparent sources of the acoustic energy that provide unique reflected acoustic energy back to the acoustic sensor 220.

The imaging sensor 222 may be a camera and/or any other sensor device that may be used to gather visual information from the monitored space surrounding the drone 200 for use in authenticating an individual and/or identifying and providing a service with the drone 200. Imaging sensor signals may be provided to the sensor analysis engine 205 and/or authentication engine 206 to computationally process the imaging sensor signals against image profiles associated with the user profiles 217 and/or service profiles 219 that are stored in the storage system 214 to determine whether substantial correspondence with any of the image profiles exists. Similarly, the biometric sensors 226 other than the acoustic sensor 220 and the imaging sensor 222 may be used to gather biometric data from an individual 805 in the monitored space 102 for use in authenticating the individual and/or identifying and providing a service with the drone 200. Biometric sensor signals may be provided to the sensor analysis engine 205 and/or authentication engine 206 to computationally process the biometric sensor signals against biometric profiles associated with the user profiles 217 and/or service profiles 219 that are stored in the storage system 214 to determine whether substantial correspondence with any of the biometric profiles exists.

The drone 200 may also include a positioning system 228 that is coupled to the drone controller 204. The positioning system 228 may include sensors for determining the location and position of the drone in the monitored space. For example the positioning system 228 may include a global positioning system (GPS) receiver, a real-time kinematic (RTK) GPS receiver, a differential GPS receiver, a Wi-Fi based positioning system (WPS) receiver, an accelerometer, and/or other positioning systems and components.

Figure 3:
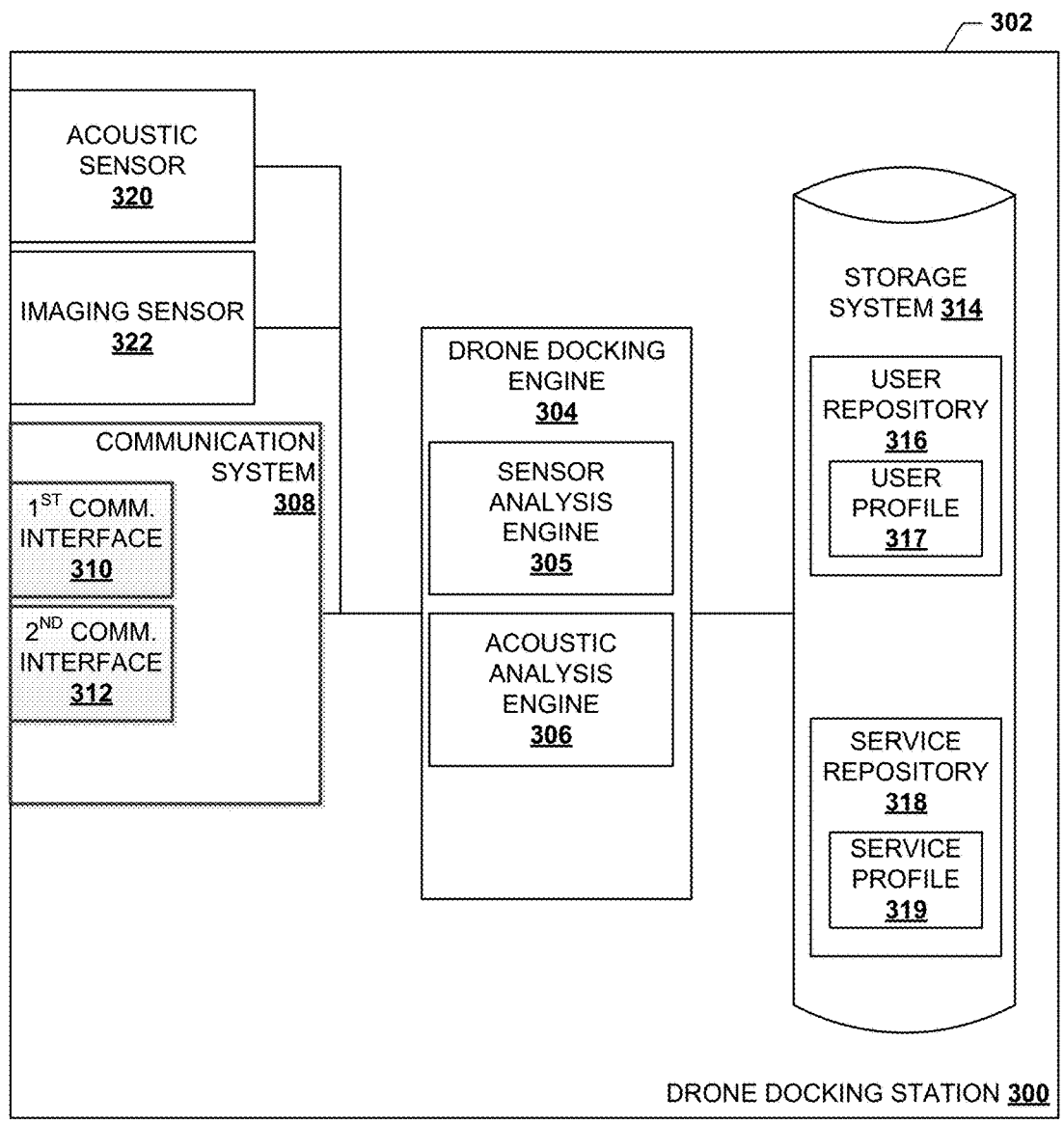
FIG. 3 is a schematic view illustrating an embodiment of a drone docking station used in the drone authentication system of FIG. 1.

Referring now to FIG. 3, an embodiment of a drone docking station 300 is illustrated that may be the drone docking station 110 discussed above with reference to FIG. 1. In the illustrated embodiment, the drone docking station 300 includes a chassis 302 that houses the components of the drone docking station 300. Several of these components are illustrated in FIG. 3. For example, the chassis 302 may house a processing system (not illustrated) and a non-transitory memory system (not illustrated) that includes instructions that, when executed by the processing system, cause the processing system to provide a drone docking engine 304 that is configured to perform the functions of the drone docking engines and/or the drone docking stations discussed below. In the specific example illustrated in FIG. 3, the drone docking engine 304 is configured to provide a sensor analysis engine 305 that computationally processes sensor signals against stored sensor signal profiles, and an authentication engine 306 that performs a primary authentication and/or a secondary authentication of a user as well as the functionality discussed below.

The chassis 302 may further house a communication system 308 that is coupled to the drone docking engine 304 (e.g., via a coupling between the communication system 308 and the processing system). The communication system 308 may include software or instructions that are stored on a computer-readable medium and that allow the drone docking station 300 to send and receive information through the communication networks discussed above. For example, the communication system 308 may include a first communication interface 310 to provide for communications through the communication network 125 as detailed above (e.g., first (e.g., long-range) transceiver(s)). In a specific example, the first communication interface 310 may be a wireless antenna that is configured to provide communications with IEEE 802.11 protocols (Wi-Fi), cellular communications, satellite communications, other microwave radio communications and/or communications. In other examples, the first communication interface 310 may provide wired communications (e.g., Ethernet protocol) from the drone docking station 300 through the communication network 125. The communication system 308 may also include a second communication interface 312 that is configured to provide direct communication with the drone 105, other drone docking stations, sensors (e.g., sensors 117 and 118), monitors, and/other devices within the monitored space 102 discussed above with reference to FIG. 1 (e.g., second (e.g., short-range) transceiver(s)). For example, the second communication interface 312 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 302 may also house a storage system 314 that is coupled to the drone docking engine 304 through the processing system and that is configured to store the rules and/or other data utilized by the drone docking engine 304 to provide the functionality discussed below. The storage system 314 may store user profiles 317 in one or more user repositories 316. The user profiles 317 may include information associated with a user of the drone authentication system 100 and/or a service provided by the drone 200. For example, a user profile 317 may include a user identifier that is associated with the user. For example, the user identifier may include a username, a phone number, an electronic mail address, a user device identifier (e.g., a communication interface identifier of a mobile device) and/or other identifiers that can identify the user. Each user identifier may have user information associated with the user identifier that can be used by the drone authentication system 100 to undertake various services. For example, the user information may include preselected preferences, third party data, gathered data by the drone authentication system 100 over time, identity data such as sensor signal profiles (e.g., an acoustic profile, an image profile, a blood profile, a DNA profile, a fingerprint profile, an ocular profile and/or other sensor signal profile that can be used to identify the individual and be updated from gathered data over time using machine learning techniques discussed below), and/or any other data used for authenticating an individual as a user and providing services to that user. In addition, the storage system 314 may include a service repository 318 that includes a plurality of service profiles 319. The service repository 318 may include one or more applications that provide instruction to the drone controller 204 and/or drone docking engine 304 when one or more conditions are satisfied in the monitored space and that may need an individual in the monitored space to be authenticated as a user. Each application may be associated with service profile 319 that includes sensor signal profiles of conditions that need to be satisfied before the application associated with that service profile can be run on the drone controller 204 and/or drone docking engine 304.

The chassis 302 may also house an acoustic sensor 320 (e.g., a microphone, a microphone array, a directionally-discriminating acoustic sensor, and other acoustic sensors), an imaging sensor 322 (e.g., a two-dimensional image capturing camera, a three-dimensional image capturing camera, an infrared image capturing camera, a depth capturing camera, similar video recorders, and/or a variety of other image or data capturing devices), and in some embodiments, an acoustic emitter and a biometric sensor (not illustrated).

For example, the acoustic sensor 320 may include an microphone array that is configured to capture audio signals from acoustic energy in a monitored space and provide the audio signals to the sensor analysis engine 305 and/or authentication engine 306 to computationally process the audio signals against acoustic profiles associated with the user profiles 317 and/or service profiles 319 that are stored in the storage system 314 to determine whether substantial correspondence with any of the acoustic profiles exists. The acoustic sensor 320 may also be used to determine an apparent direction and/or location of the apparent source that provided the acoustic energy as discussed further below.

The imaging sensor 322 may be a camera and/or any other sensor device that may be used to gather visual information from the monitored space surrounding the drone docking station 300 for use in authenticating an individual and/or identifying and providing a service with the drone docking station 300. Imaging sensor signals may be provided to the sensor analysis engine 305 and/or authentication engine 306 to computationally process the imaging sensor signals against image profiles associated with the user profiles 317 and/or service profiles 319 that are stored in the storage system 314 to determine whether substantial correspondence with any of the image profiles exists.

Figure 4:
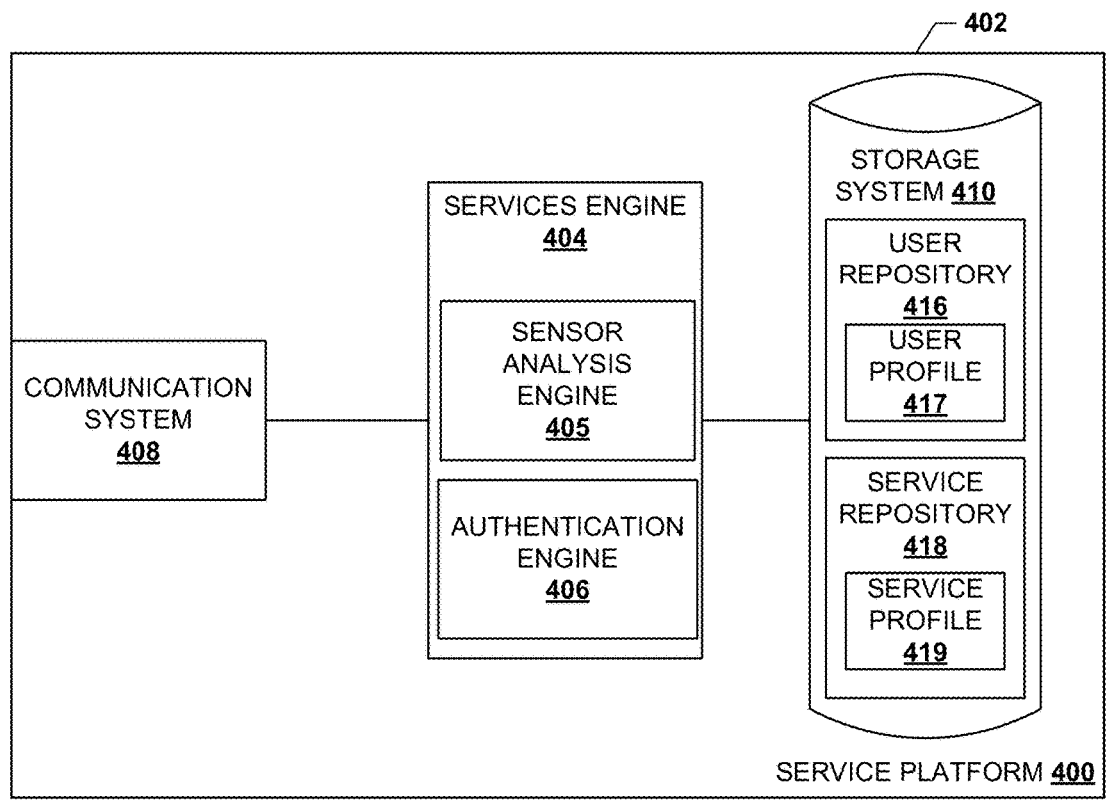
FIG. 4 is a schematic view illustrating an embodiment of a service platform used in the drone authentication system of FIG. 1.

Referring now to FIG. 4, an embodiment of a service platform 400 is illustrated that may be the service platform 130 discussed above with reference to FIG. 1. In the illustrated embodiment, the service platform 400 includes a chassis 402 that houses the components of the service platform 400, only some of which are illustrated in FIG. 4. For example, the chassis 402 may house a processing system (not illustrated) and a non-transitory memory system (not illustrated) that includes instructions that, when executed by the processing system, cause the processing system to provide a services engine 404 that is configured to perform the functions of the services engines and/or service provider devices discussed below. In the specific example illustrated in FIG. 4, the services engine 404 is configured to provide a sensor analysis engine 405 that computationally processes sensor signals against stored sensor signal profiles, and an authentication engine 406 that performs a primary authentication and/or a secondary authentication of a user as well as the functionality discussed below.

The chassis 402 may further house a communication system 408 that is coupled to the services engine 404 (e.g., via a coupling between the communication system 408 and the processing system) and that is configured to provide for communication through the network as detailed below. The communication system 408 may allow the service platform 400 to send and receive information over the communication network 125 of FIG. 1. The chassis 402 may also house a storage system 410 that is coupled to the services engine 404 through the processing system and that is configured to store the rules and/or other data utilized by the services engine 404 to provide the functionality discussed below. The storage system 410 may store user profiles 417 in one or more user repositories 416. The user profiles 417 may include information associated with a user of the drone authentication system 100 and/or a service provided by the drone 105/200 and/or service platform 400. For example, a user profile 417 may include a user identifier that is associated with the user. For example, the user identifier may include a username, a phone number, an electronic mail address, a user device identifier (e.g., a communication interface identifier of a mobile device) and/or other identifiers that can identify the user. Each user identifier may have user information associated with the user identifier that can be used by the drone authentication system 100 to undertake various services. For example, the user information may include preselected preferences, third party data, gathered data by the drone authentication system 100 over time, identity data such as sensor signal profiles (e.g., an acoustic profile, an image profile, a blood profile, a DNA profile, a fingerprint profile, an ocular profile and/or other sensor signal profile that can be used to identify the individual and be updated from gathered data over time using machine learning techniques discussed below), and/or any other data used for authenticating an individual as a user and providing services to that user. In addition, the storage system 410 may include a service repository 418 that includes a plurality of service profiles 419. The service repository 418 may include one or more applications that provide instruction to the services engine 404 and/or drone controller 204 when one or more conditions are satisfied in the monitored space and that may need an individual in the monitored space to be authenticated as a user. Each application may be associated with service profile 419 that includes sensor signal profiles of conditions that need to be satisfied before the application associated with that service profile can be run on the drone controller 204 and/or services engine 404.

Figure 5:
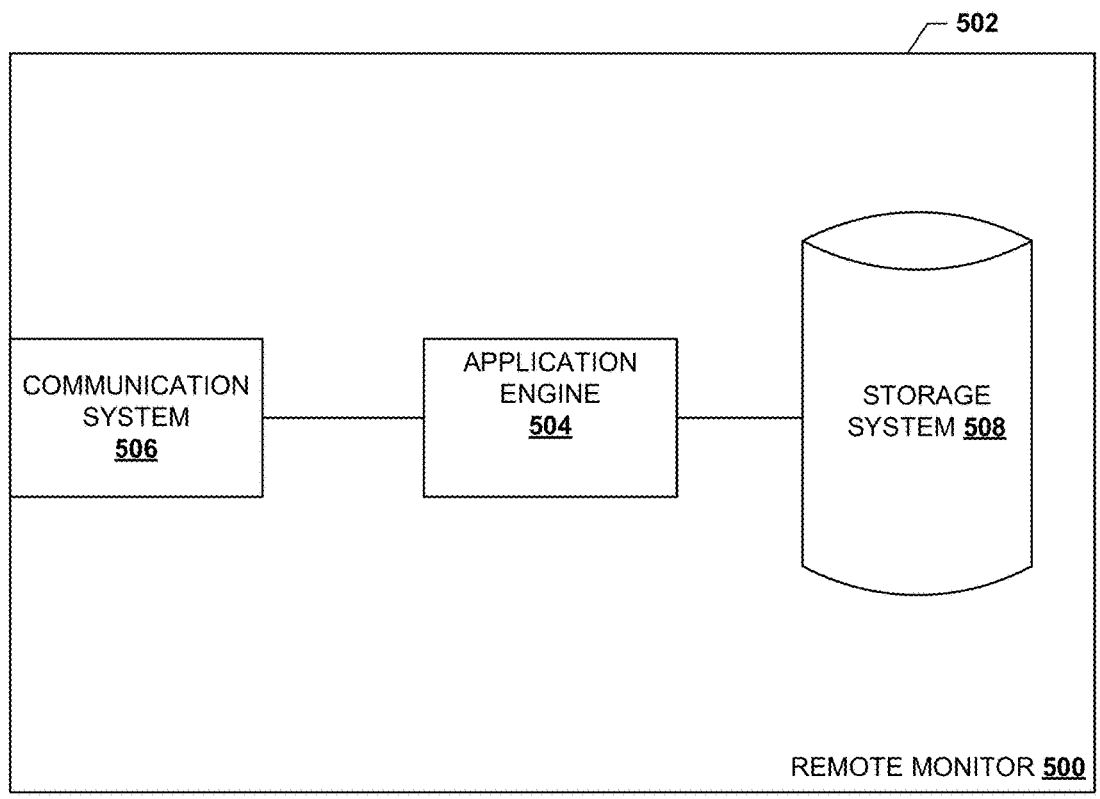
FIG. 5 is a schematic view illustrating an embodiment of a remote monitor used in the drone authentication system of FIG. 1.

Referring now to FIG. 5 an embodiment of a remote monitor 500 is illustrated that may be the remote monitor 120 discussed above with reference to FIG. 1. In the illustrated embodiment, the remote monitor 500 includes a chassis 502 that houses the components of the remote monitor 500. Several of these components are illustrated in FIG. 5. For example, the chassis 502 may house a processing system (not illustrated) and a non-transitory memory system (not illustrated) that includes instructions that, when executed by the processing system, cause the processing system to provide an application engine 504 that is configured to perform the functions of the application engines, drone applications, and/or remote monitors discussed below. In the specific example illustrated in FIG. 5, the application engine 504 is configured to receive notifications from a drone and/or drone docking station that include audio feeds and video feeds, provide those notifications to an user through a drone application, receive instructions from the user through the drone application, and provide those instructions over a communication network to the drone and/or drone docking station as well as the functionality discussed below.

The chassis 502 may further house a communication system 506 that is coupled to the application engine 504 (e.g., via a coupling between the communication system 506 and the processing system) and that is configured to provide for communication through the network as detailed below. The communication system 506 may allow the remote monitor 500 to send and receive information over the communication network 125 of FIG. 1. The chassis 502 may also house a storage system 508 that is coupled to the application engine 504 through the processing system that is configured to store the rules, graphics, and/or other data utilized by the application engine 504 to provide the functionality discussed below. While the storage system 508 has been illustrated as housed in the chassis 502 of the remote monitor 500, one of skill in the art will recognize that the storage system 508 may be connected to the application engine 504 through the communication network 125 via the communication system 506 without departing from the scope of the present disclosure.

Figure 6:
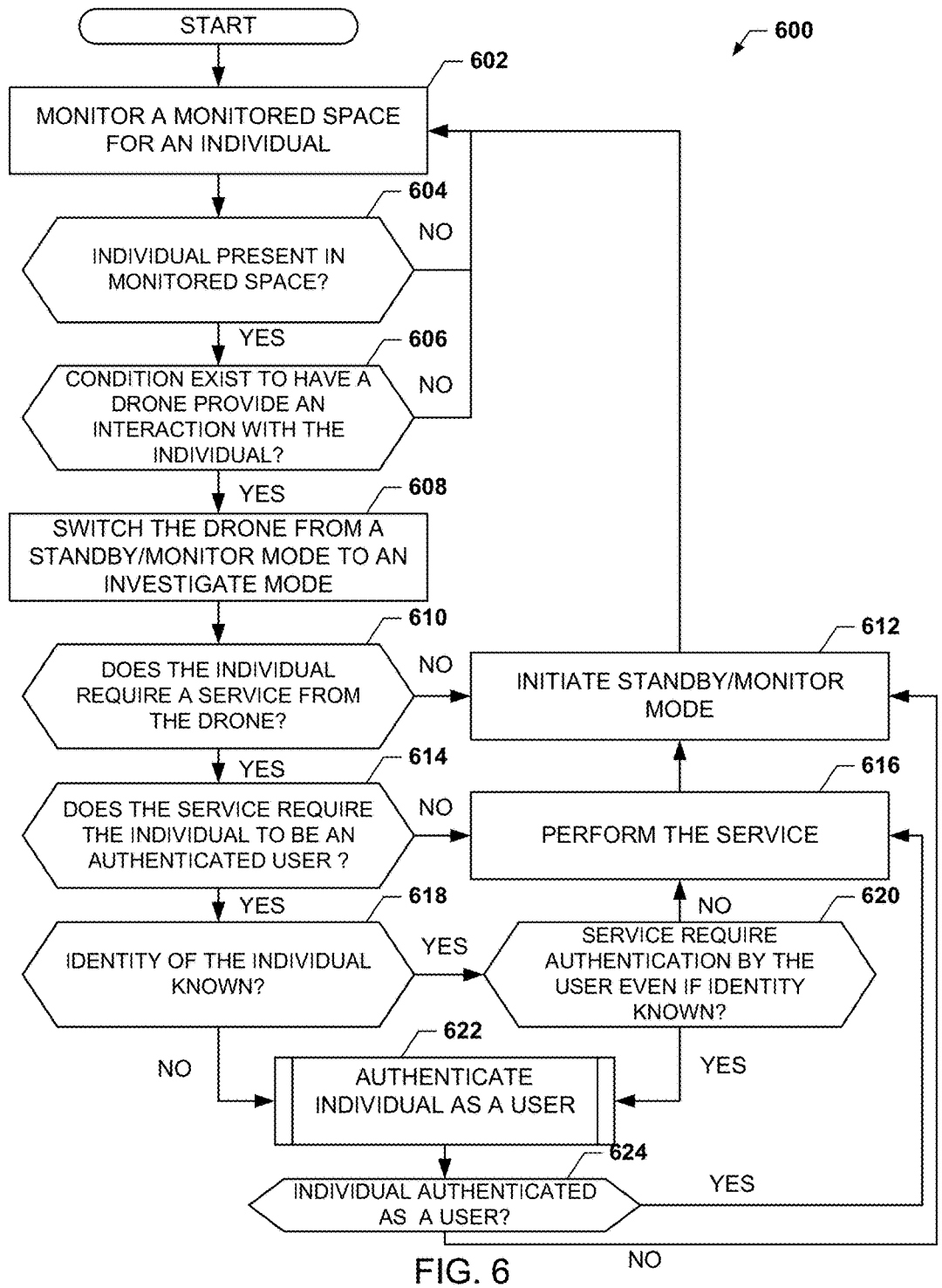
FIG. 6 is a flow chart illustrating an embodiment of a method of providing a service that requires authentication.

Referring now to FIG. 6, an embodiment of a method 600 for user authentication is illustrated. As discussed below, the systems and methods of the present disclosure provide a drone authentication system that includes a drone and optionally a drone docking station that authenticates individuals in a monitored space as users of the drone authentication system and/or service provided via the drone authentication system. The drone authentication system may include a drone that can provide various services and/or provide various interactions with individuals such as humans, animals (e.g., livestock, pets, and wildlife), and plants (e.g., trees and crops) and/or other identifiable objects (e.g., fences, buildings, vehicles, other drones). When providing services to individuals, the service and/or drone authentication system may require that the individual is authenticated before certain services can be provided. Conventional authentication requires that the individual provide a password or passphrase. However, in certain situations, conventional authentication is not practical because the individual is experiencing a health issue preventing them from providing the authentication credential, the conditions in the monitored space require extra credentials, the conditions in the monitored space make the individual inaccessible, and/or there are privacy concerns with the individual providing the credentials in a public space where the authentication credentials may be overheard or seen by other individuals. The systems and methods of the present disclosure assess the monitored space, in which the individual requiring a service is located, to determine whether any conditions have been satisfied or exist that require a secondary authentication response from the individual and determine what the secondary authentication response should be based on those conditions. The drone authentication system then captures sensor signals from sensors that can be used to perform the secondary authentication. These systems and methods improve a drone's ability to provide services to individuals in situations where the drone would otherwise be unable to authenticate the individuals when those services require authentication.

The method 600 begins at block 602 where a monitored space is monitored for a presence of an individual. In an embodiment, at block 602 and with reference to the drone authentication system 800 of FIG. 8, the drone 105/200 and/or the drone docking station 110/300 may be in a monitoring mode, also referred herein as a standby mode, and monitor for an individual 805 (e.g., a human, an animal, and/or other living thing) in a monitored space 102 (e.g., a yard, a home, a business, a park, a stadium, a transmission line area, an access space, underground shafts, or other spaces). The monitored space 102 may be contiguous or non-contiguous. The monitored space 102 may be defined by geofencing techniques that may include specific geographic coordinates such as latitude, longitude, and/or altitude, and/or operate within a range defined by a wireless communication signal.

The drone 105/200 may include one or more sensors (e.g., an imaging sensor 114, a biometric sensor 113, and/or an acoustic sensor 115) that may generate sensor signals that can be computationally processed to determine whether an individual is present within the monitored space 102. Likewise, the drone docking station 110/300 may include the sensor 116 that may generate sensor signals that can be computationally processed to determine whether an individual is present within the monitored space 102. In another example, the drone 105 and the drone docking station 110 may be coupled (e.g., wired and/or wirelessly) with sensors 117 and 118 that are dispersed throughout the monitored space 102 that may generate sensor signals that can be computationally processed to determine whether an individual is present within the monitored space 102. The sensor signals can be processed by one or more of the sensor analysis engines 205, 305, and 405.

While in the monitoring mode, the drone 105/200 may be docked with the drone docking station 110. However, in other examples, the drone 105/200 may be at a monitor location or a standby location, the drone 105/200 may be proceeding along a patrol path within the monitored space 102, or at another monitoring position such as hovering in the monitored space 102. While the drone 105/200 and/or the drone docking station 110/300 is monitoring the monitored space 102, the drone 105/200 and/or the drone docking station 110/300 may be generating sensor signals and or receiving sensor signals from any of the sensors 113, 114, 115, 116, 117, and/or 118 in the monitored space 102. While the above example for block 602 of method 600 describes the drone 105/200 being in a monitoring mode when monitoring the monitored space, one skilled in the art in possession of the present disclosure will recognize that at block 602 the drone 105/200 may be in any other mode, such as in-flight mode or in an investigate mode as described further below, and still be monitoring the monitored space 102 for sensor signals.

Figure 8:
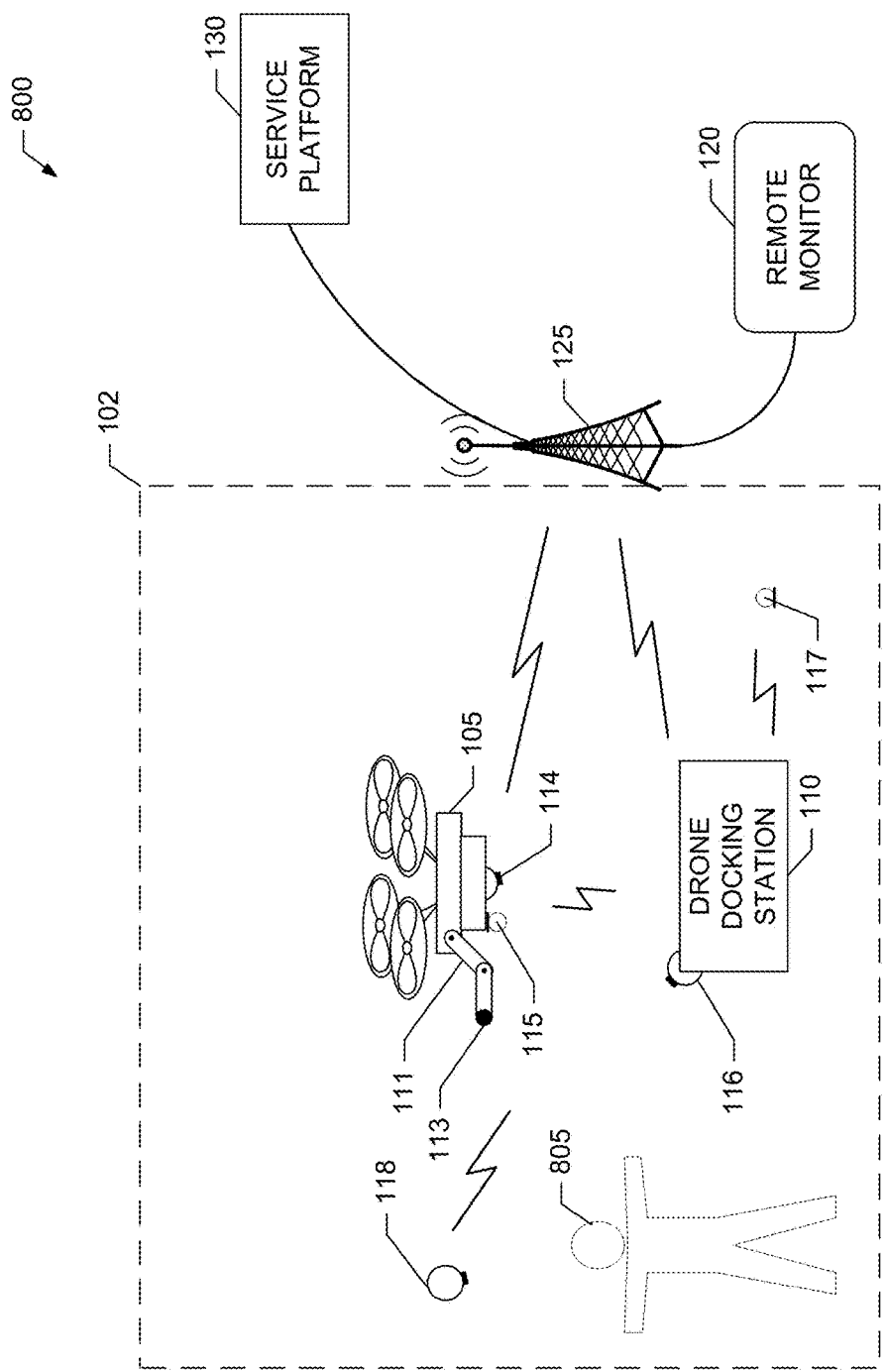
FIG. 8 is a schematic view illustrating an embodiment of the drone authentication system during the method of FIG. 6.

As shown in the example illustrated in FIG. 8, embodiments of the drone authentication system 800 are illustrated that include the drone authentication system 100 as illustrated in FIG. 1. As illustrated in FIG. 8, the drone authentication system 800 may be in a monitoring mode monitoring a monitored space 102 for an individual 805 in the monitored space 102 as described at block 602. In the illustrated example, the drone 105 may be hovering above the drone docking station 110 awaiting sensor signals captured by any of the sensors 113-118 that are in the monitored space 102. For example, the acoustic sensors 115 and 117 may be generating audio signals based on acoustic energy received at the acoustic sensors 115 and 117. The acoustic energy may be generated by an apparent source. For example, bird vocal cords may generate a "tweet" sound or a car horn when activated may generate a "honk" sound. In other examples, the acoustic energy may be reflected acoustic energy by an apparent source. For example, a communications wire transmission pole may reflect the sound of wind to provide acoustic energy and/or reflect acoustic energy generated from an acoustic emitter 224 such that reflected acoustic energy is received by the acoustic sensors 115 and 117. The imaging sensors 114, 116 and/or 118 may be generating digital images of the monitored spaces based on light radiation, infrared radiation, and other electromagnetic radiation. In another example, the communication interfaces (e.g., communication interfaces 210, 212, 310, and/or 312) may be monitoring for wireless signals from user devices, which upon detection assumes a presence of an individual. The biometric sensor 113 may include a chemical sensor that can detect levels of carbon dioxide and/or include a microwave radar that may receive microwave radiation that may be computationally processed to detect a breathing pattern and/or a heartbeat of living things within the monitored space 102. Any sensor data gathered by one or more of the sensors 113-118 may be converted into sensor signals which include electrical signals that can be processed by the sensor analysis engine 205, 305, and/or 405 included in the drone authentication system 800.

The method 600 then proceeds to block 604 where it is determined whether an individual is present in the monitored space. In an embodiment, at block 604 the sensor signals generated by at least one of the sensors 113-118 are computationally processed against one or more individual presences profiles included in service profile 219, 319, and/or 419. In an embodiment, at block 604 the sensor analysis engine 205, 305, and/or 405 of the drone 105/200, drone docking station 110/300, and/or service platform 130/400 may computationally process the sensor signals received by the one or more sensors 113-118. The sensor analysis engine 205, 305, and/or 405 may determine whether any of the sensor signals have substantial correspondence with an individual presence profile stored in the respective service repositories 218, 318, and/or 418. A sensor signal profile described herein may be a digital summary of a sensor signal such as a sensor fingerprint that can be used to identify a sample of the sensor signal generated by one or more sensors that is obtained from the monitored space 102. For example, the individual presence profile may be a digital summary indicating an individual (e.g., a human and/or a specific animal). For example, the individual presence profile may include an acoustic profile of an individual. The acoustic profile may include feature vectors that define characteristics of an audio signal such as an average zero-crossing rate, average spectrum prominent tones across a set of frequency bands, estimated tempo, spectral flatness, bandwidth, and/or other audio signal features suitable for identifying audio signals. The acoustic profile may be associated with an apparent source identifier that identifies an apparent source that provides the acoustic profile, which may be an individual.

Sensor profiles, such as an acoustic profile of an individual presence profile, may also be configured such that any compression and/or encoding techniques (e.g., AAC, MP3, WMA, Vorbis, and other audio compression and/or encoding techniques) performed on the sensor signal to allow an acoustic analysis engine included on the sensor analysis engine 205, 305, and/or 405 to identify the sensor signal based on the sensor signal profiles. The sensor signals have substantial correspondence with a sensor signal profile when a predefined condition is satisfied. For example, the predefined condition may be that one or more feature vectors of the sensor signal match or are within a threshold of similarity (e.g., 50% similar, 60% similar, 70% similar, 80% similar, 85% similar, 90% similar, 95% similar, 99% similar, 100% similar and other thresholds of similarity) between the sensor signal and an sensor signal profile. Substantial correspondence may also include situations where unsupervised machined learning techniques (e.g., using cluster analysis), and/or supervised machine learning techniques (e.g., using statistical classification) determines that sensors signals in one group are more similar to each other than those in other groups.

In another example, computer vision methods (e.g., object recognition) may be used to computationally process an image against an individual presence profile. For example, the sensor analysis engine 205, 305, and/or 405 may include an image analysis engine that may computationally process feature vectors from a captured image and determine whether the feature vectors from the captured image have substantial correspondence with any individual presence profile. In an example, the individual presence profile may be stored locally on the storage system 214 of the drone 105 and/or the storage system 314 of the drone docking station 110 and provided in the local service repository 218 and/or 318, and/or stored remotely and managed at the service platform 130 to provide the remote service repository 418.

In an example, if the sensor signal lacks substantial correspondence with the individual presence profiles of the local service repository 218 and/or 318, the drone 105 or the drone docking station 110 may provide the sensor signal, feature vectors of the sensor signal, and/or a compressed and/or encoded version of the sensor signal to the service platform 130/400 through the communication network 125. The sensor analysis engine 405 of the service platform 400 may computationally process the sensor signal (e.g., feature vectors of the sensor signal, the compressed and/or encoded sensor signal, and/or other variations of the sensor signal) by determining whether the sensor signal substantially corresponds with an individual presence profile stored remotely at the service repository 418 in the storage system 410. In a specific example, the local service repositories 218 and 318 at the storage systems 214 and 314 may store a first portion of the individual presence profile and the remote service repository 418 at the storage system 410 may store a second portion of the presence indication profiles.

If the sensor signals indicate that the monitored space 102 does not include an individual, then the method 600 returns to block 602. If the sensor signals indicate that an individual is present, then the method 600 proceeds to block 606 where it is determined whether a condition exists to have the drone 105 to provide an interaction with the individual that is detected. For example, the sensor analysis engine 205, 305, and or 405 may determine, based on the sensor signals used to determine whether an individual is present in the monitored space 102 and/or sensor signals received after determining that the individual is present in the monitored space 102, whether those sensor signals satisfy any conditions that are stored in the condition profile that may be included in the service profiles 219, 319, and/or 419 of the storage systems 214, 314, and 410 respectively.

Figure 9:
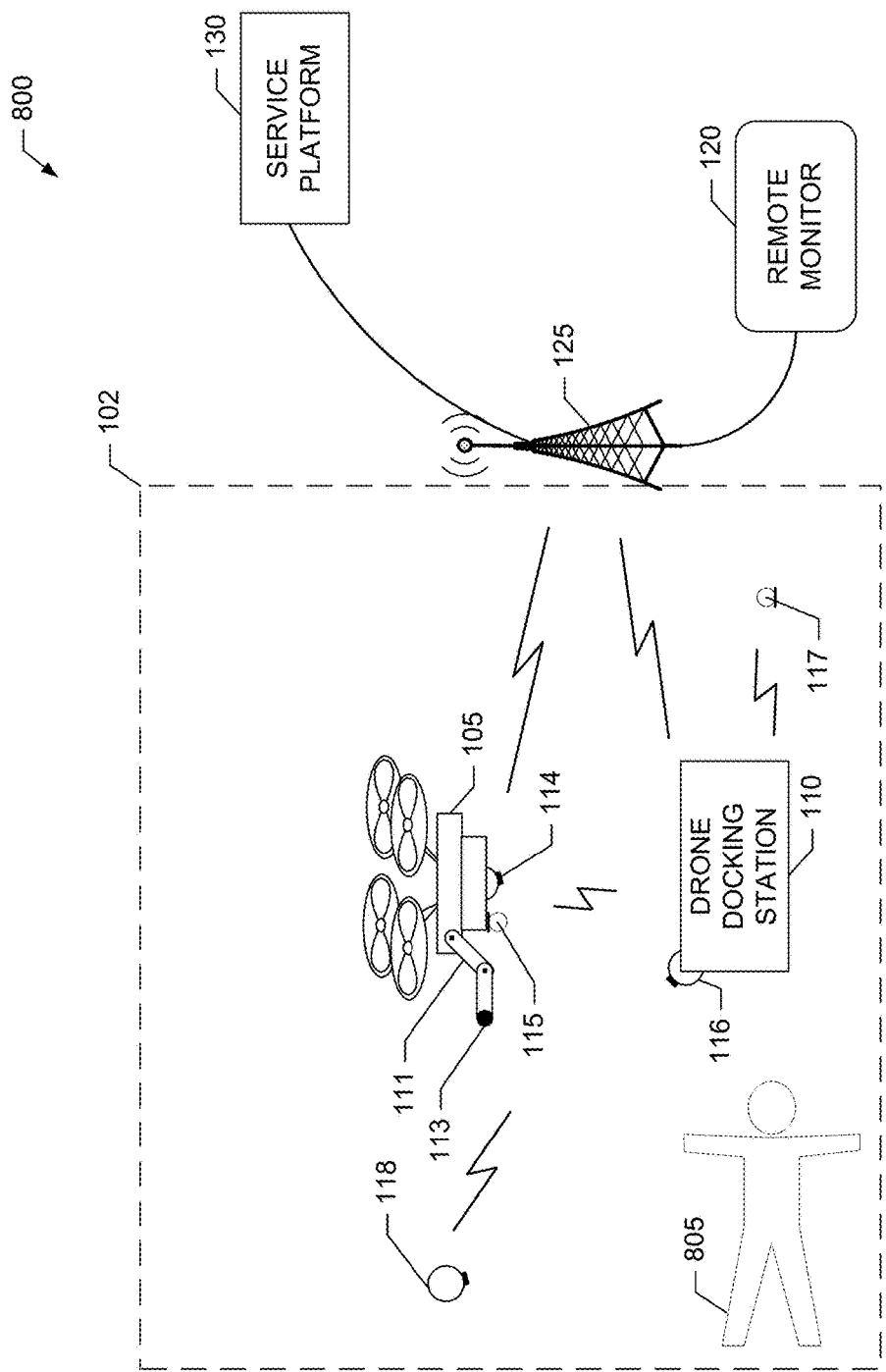
FIG. 9 is a schematic view illustrating an embodiment of the drone authentication system of FIG. 8 where an individual is present in a monitored space and a condition exists for the drone to initiate an interaction with the individual during the method of FIG. 6.

In one example, the condition may be solely the detection of an individual in the monitored space. For example, the monitored space 102 may be a secured area that requires user authentication to enter. In another example, the sensor analysis engines 205, 305, and/or 405 may be monitoring for various cues or actions provided by the individual via the acoustic sensors 115 and/or 117 and/or the imaging sensors 114, 116, and/or 118. As illustrated in FIG. 9, at least one of the imaging sensors 114, 116, and/or 118 may capture an image or series of images that, when computationally processed by the sensor analysis engine 205, 305, and/or 405, indicate the individual 805 is lying on the ground and/or moved to the ground within a predefined time period indicating that individual 805 collapsed. The condition of the individual lying on the ground and/or moved to the ground within a predefined time period may substantially correspond with a condition profile stored in the service repository 218, 318, and 418. In other examples, the individual may provide an audio cue and/or a visual cue that the sensor analysis engine 205, 305, and/or 405 recognizes as a condition to initiate an interaction with the individual. For example, the individual 805 may wave their hands at one or more of the imaging sensors 114, 116, and/or 118 and/or the individual 805 may speak a keyword and the acoustic energy received by an acoustic sensor 115 and/or 117 may be converted to an acoustic signal that the sensor analysis engine 205, 305, and/or 405 computationally processes against an acoustic profiles stored in the service profiles 219, 319, and 419 included in the service repository 218, 318, and 418. In yet another example, the condition may be based on the environment of the monitored space 102 such as time of day, an event occurring in the monitored space (e.g., a concert, a race, etc.), weather conditions, and/or the location of the monitored space.

Figure 10:
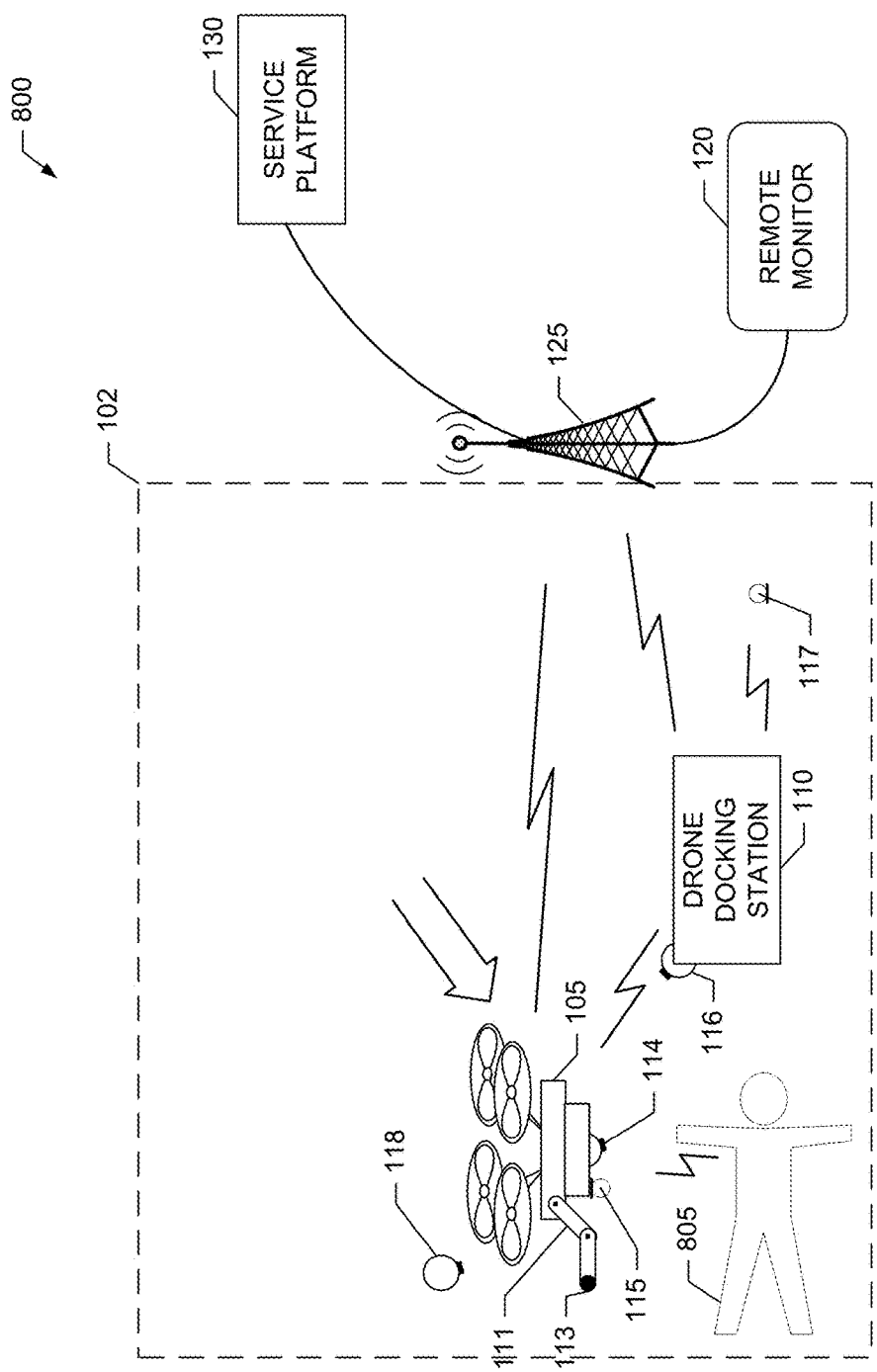
FIG. 10 is a schematic view illustrating an embodiment of the drone authentication system of FIG. 9 where a drone is in-flight toward the individual due to the presence of the condition during the method of FIG. 6.

If a condition does not exist in the monitored space 102, then the method 600 may return to block 602 where the drone authentication system 100 may continue to monitor the monitored space 102 in a monitor/standby mode for an individual or in a situation where the individual 805 is still present, continue to determine whether a condition exists in the monitored space 102 at block 606. If a condition exists in the monitored space 102, then the method 600 may continue to block 608, where the drone 105 is switched from a standby/monitor mode to an in-flight mode. Referring to FIG. 10, when the drone 105 is in an in-flight mode, the drone 105 may be in-flight toward the position of the individual 805 until the drone 105 is within a predetermined distance of the individual 805. The drone 105 may be in-flight when the drone is autonomously navigating toward an apparent position of an individual as discussed in further detail below. The drone 105 may be considered not to be in-flight when the drone 105 is hovering at a monitoring location or on a patrol path but otherwise flying in the air when the drone is a UAV.

In an embodiment, the sensor analysis engine 205, 305, and/or 405 may determine an apparent position of the individual such as a relative direction from which acoustic energy is being provided by the individual and/or the approximate location of the individual. For example, the drone authentication system 100 may include the acoustic sensors 115 and 117 that are positioned about monitored space 102 to receive acoustic energy and capture audio signals within the monitored space 102. The sensor analysis engines 205 and/or 305 may create a time stamp that includes the time at which each acoustic sensor 115 and 117 captured the audio signal. The sensor analysis engines 205 and/or 305 may then use known positions of the acoustic sensors 115 and 117 along with the time stamps that indicate when each acoustic sensor 115 and 117 captured the audio signal to determine the source location of the audio signal based on time-difference-of-arrival (TDOA) and triangulation techniques. In another example, the acoustic sensors 115 and 117 may be directionally-discriminating acoustic sensors that are configured to determine the general direction from which acoustic energy is being provided. The sensor analysis engine 205 and 305 may then provide the apparent position to the mobility controller 207 of the drone 105/200 such that the drone 105/200 may autonomously navigate toward the apparent position of the individual 805 providing the acoustic energy.

In another example, the imaging sensor 114, 116, and/or 118 of the drone authentication system 100 may be used to determine the apparent position of the individual 805. In an example, the imaging sensor 114 may be positioned at an angle while directed at the individual 805 and while the drone 105 is hovering above the ground. When an image is captured of the individual 805 by the imaging sensor 114, other sensor data may be gathered as well, which may include position data from the positioning system 228 of the drone 105 when the image was captured, the angle of the imaging sensor 114 when the image was captured, and the distance the drone 105 is from the ground, which may be provided by an altimeter included on the drone 105. Based on the angle of the imaging sensor 114 and the distance between the ground and the drone 105, the sensor analysis engine 205 may determine the horizontal distance between the drone 105 and the individual 805. Based on the horizontal distance and the positioning coordinates of the drone 105, the sensor analysis engine 205 may determine the positioning coordinates of the individual 805, which are then provided to the mobility controller 207 of the drone 105 such that the drone 105/200 may autonomously navigate toward those positioning coordinates of the individual 805.

The drone 105/200 and/or the drone docking station 110/300 may be continually monitoring the monitored space 102 while the drone 105/200 is in-flight toward the apparent source of the individual 805. The drone 105 may autonomously navigate toward the position of the individual 805 until the drone is within a predetermined range of that position. For example, the drone 105 may be within 1 foot, 2 feet, 5 feet, 10 feet, 20 feet, or any other predetermined range. The predetermined range may be based on the condition that caused the drone to be in the in-flight mode. For example, when the individual is on the ground, the predetermined range may be 2 feet, while if the individual 805 was waving to the drone 105, the predetermined range may be 10 feet. When the drone 105 arrives within the predetermined range of the individual, the drone 105 may enter an investigate mode where the drone 105 hovers within the predetermined range of the individual 805.

The method 600 then proceeds to block 610, where it is determined whether the individual requires a service. While in the investigate mode, the drone 105 may provide an interaction with the individual 805 and receive sensor data based on that interaction. For example, the drone 105 may provide through the acoustic emitter 224 an audible question. The individual 805 may provide a verbal response to the question to the drone 105, which the acoustic sensor 115 may provide as an audio signal to the sensor analysis engine 205 that may computationally process the audio signal against service profiles 219, 319, and/or 419 included in the service repository 218, 318, and/or 418, respectively. Upon substantial correspondence between the audio signal and the service profiles 219, 319, and/or 419 in the service repositories 218, 318, 418 that indicates no service is required, or lack of substantial correspondence with any of the service profiles 219, 319, and/or 419, the drone 105 may determine that the individual 805 does not require a service, in which case the method 600 proceeds to block 612 where the standby/monitor mode is initiated. The drone 105 may proceed back to a standby position, as shown in the example illustrated in FIG. 11, and/or hover at its current position until a condition exists for the drone 105 to have an interaction with an individual in the monitored space 102.

The drone controller 204, the drone docking engine 304, and/or the services engine 404 may include machine learning/artificial intelligence algorithms to learn what conditions may require further investigation to determine whether a user requires a service and what conditions do not require investigation to determine whether an individual requires a service. If conditions are present where the drone authentication system 100 identifies that a service is required but upon further investigation and/or interaction with the individual determines that no service is required, the drone controller 204, the drone docking engine 304, and/or the services engine 404 may update the condition profiles, the individual presence profiles, and/or other information in the service profiles 219, 319, and/or 419 to indicate that service was not needed based on the conditions that caused the drone 105 to be "in-flight" and to investigate the condition. The drone controller 204, the drone docking engine 304, and/or the services engine 404 may be configured with one or more machine learning algorithms to perform supervised machine learning, unsupervised machine learning (e.g., deep belief networks, neural networks, statistical pattern recognition, rule-based artificial intelligence, etc.) semi-supervised learning, reinforcement learning, deep learning, and other machine learning algorithms when updating, creating, and/or reinforcing a condition profile, an individual presence profile, a service profile, 219, 319, and/or 419, a user profile 217, 317, and/or 417, and/or any other profile stored in the user repositories 215, 316, and/or 416 and service repositories 218, 318, and/or 418 discussed herein that is updatable over time based on received sensor signals.

If the individual requires a service, for example because the user requests the service by providing a visual indication and/or acoustic indication to the drone 105 that the sensor analysis engine 205, 305, and/or 405 determines is associated with an available service, then the method 600 proceeds to block 614 where the drone authentication system 100 determines whether the service requires the individual to be a user of the service. Each service profile of service profiles 219, 319, and/or 419 may be associated with a service. The service profiles may indicate a level of authentication for the service. For example, the drone 105 may be configured to provide a plurality of services and/or provide services provided by a service provider through the communication network 125. For example, the drone 105 may be configured to provide medical treatment to the individual 805, retrieve and/or deliver an object for the individual 805, take a photo for the individual 805, notify emergency personnel, place an order for a good and/or service, and/or other services that a drone 105 may provide. In addition, the drone 105 may be able to access third party service through the communication network 125. For example, a user of the drone 105 may order a pizza through the drone 105 from a pizzeria that provides an application for ordering pizzas on the service platform 130 through which the drone may communicate. Each of these services may require that the individual 805, with which the drone 105 is interacting, be an authenticated user of the drone 105 and/or the service that is being activated. For example, if the drone 105 is asked to provide the current coordinates of the individual, the service profile associated with that service may not require that the individual 805 is an authenticated user. However, if the individual 805 is requiring medical assistance from the drone 105, then the service profile associated with the service may require drone 105 to know the identity of the individual and authenticate the individual as a user of the service before performing a specific medical procedure as an authenticated user.

Figure 11:
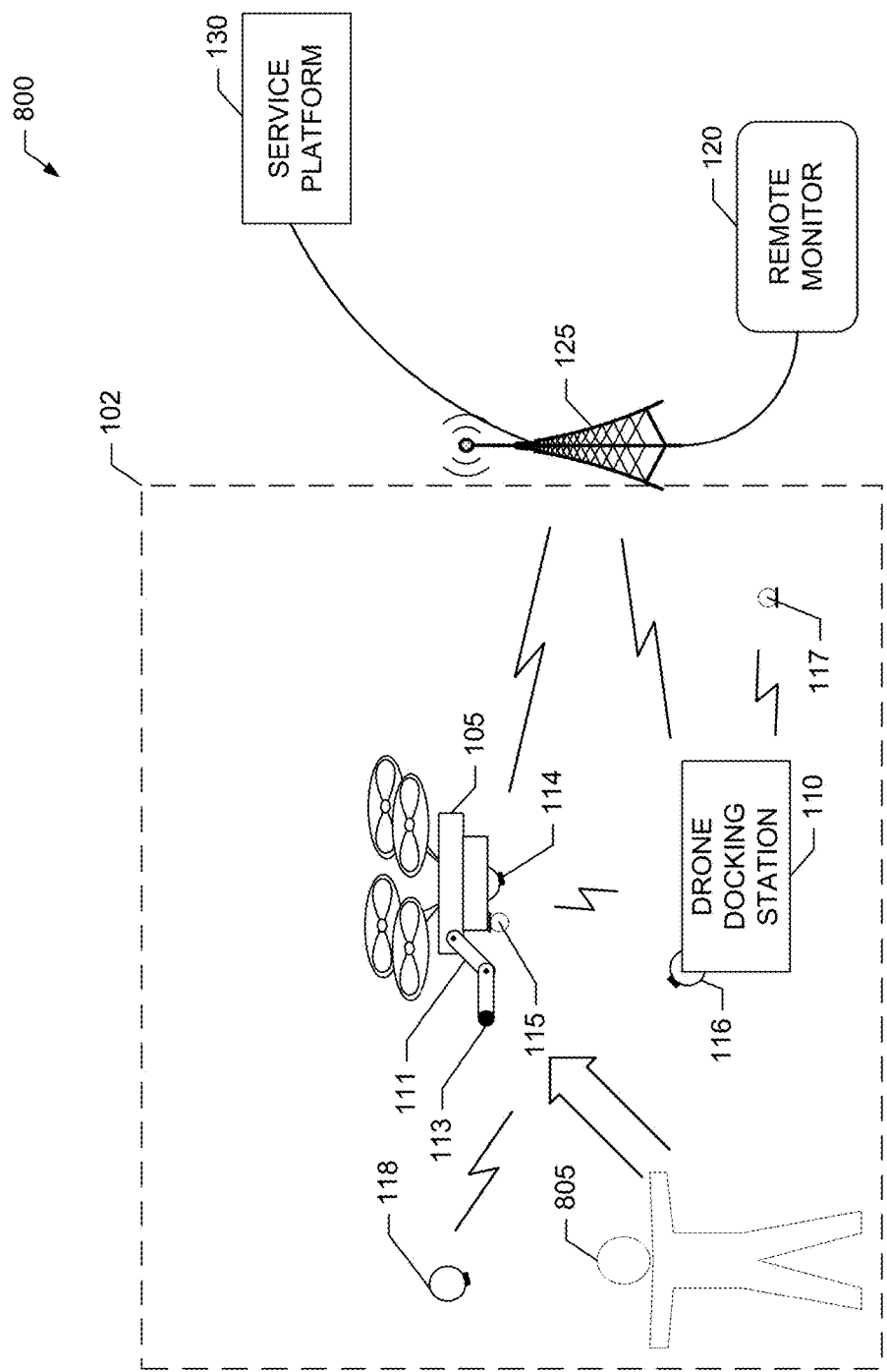
FIG. 11 is a schematic view illustrating an embodiment of the drone authentication system of FIG. 10 where the drone returns to a monitoring/standby position during the method of FIG. 6.

If the service does not require that the individual to be an authenticated user, the method 600 may continue with block 616 where the drone 105 performs the service or facilitates the performance of the service by the third party service provider through the communication network 125. The method 600 then continues to block 612, where the drone 105 returns to a standby/monitoring mode when the service is completed and as illustrated in FIG. 11. However, if the service requires that the individual be an authenticated user of the service before the drone 105 provides and/or facilitates the performance of the service for the third party service provider, then the method 600 proceeds to block 618, where the drone authentication system determines whether the identity of the individual requiring the service is known to the drone authentication system. For example, the drone 105 may be a "follow-me" drone that is configured to follow a particular individual and/or group of individuals. Thus, the drone authentication system 100 would already know the identity of the individual 805 as a user of the drone authentication system 100. In other situations, the drone authentication system 100 may have determined the identity of the individual 805 prior to determining whether the user required a service, for example, when the individual 805 became present in the monitored space 102 at block 604. The drone authentication system 100, when determining whether the sensors signals indicated that a user was present in the monitored space 102, may have additionally performed facial recognition on captured images, voice recognition on captured audio signals, and/or determined an identity of the individual based on a user device identifier provided in a wireless signal between the individual's user device and any of the communication interfaces 210, 212, 310, and/or 312, as discussed in more detail below.

If the identity of the individual is known, the method 600 proceeds to block 620 where it is determined whether the service still requires the user of the drone authentication system 100 to be an authenticated user for the particular service. If the service does not require further authentication, the method 600 may proceed to block 616 where the service is performed by the drone 105 and/or third party service provider in conjunction with the drone 105. However, in some situations, the service may require additional authentication or require a particular user authentication before the service is performed. Continuing with the specific example in FIG. 10, the individual 805 may be known to the drone authentication system 100 as a user of the drone authentication system 100. However, because the individual 805 requires a medical service, due to the drone authentication system 100 determining that the individual has collapsed, additional and/or a particular type of user authentication may be necessary before the drone 105 provides the medical service. Thus, if the service requires authentication by the user, even if the identity of the user is known in block 620 or the identity of the individual is unknown in block 618, the method 600 proceeds to block 622 where authentication of the individual as a user of the identified service is performed.

Figure 7:
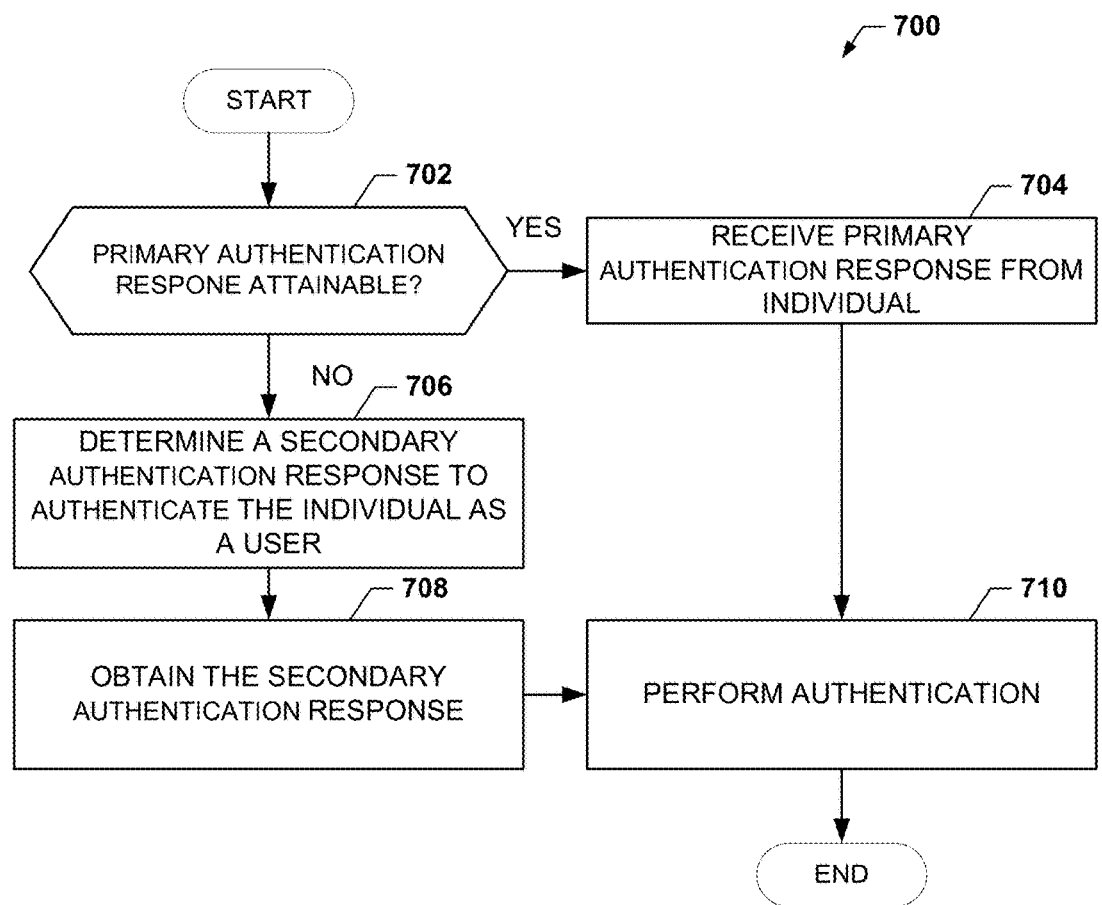
FIG. 7 is a flow chart illustrating an embodiment of a sub-method of authenticating an individual as a user of the service provided by the drone authentication system of the method in FIG. 6.

Referring now FIG. 7, block 622 of method is provided by sub-method 700. At block 702, it may be determined whether a primary authentication response required by the service is attainable. Each service profile 219, 319, and/or 419 associated with the service may have a primary authentication response associated with the service profile 219, 319, and/or 419 that is preferred when authenticating the individual 805 as a user of the service. For example, the service may require spoken user credentials such as a username and password that the authentication engine 206, 306, and/or 406 may perform speech recognition and/or voice recognition on the spoken credentials to verify that the individual is an authenticated user.

However, in some situations, the primary authentication may be difficult to provide to the drone authentication system 100 (e.g., the monitored space 102 includes sufficient acoustic noise that prevents the drone authentication system 100 from capturing acoustic energy generated from the individual's vocal cords). In other situations there may be a lack of privacy in providing the primary authentication (e.g., the individual requesting the service is with one or more other individuals). In yet other scenarios, the individual may not be able to physically provide the primary authentication response. For example, the individual may be unconscious or otherwise incapacitated such that the individual is unable to provide a response, and/or the user has a medical condition (e.g., memory loss, Alzheimer's disease, recent head trauma, under the influence of drugs and/or alcohol), and/or other conditions that the drone authentication system may recognize as conditions where the primary authentication response is not attainable from the user.

The authentication engine 206, 306, and/or 406 may determine whether the primary authentication is available based on the conditions identified in the monitored space 102 using a first set of sensors when the drone authentication system 100 is in the investigate mode. The user profiles 217, 317, and/or 417 and/or services profiles 219, 319, and/or 419 may include condition profiles similar to those when determining whether to perform a service and/or cause the drone 105 to be "in-flight" towards the apparent position of the individual. The authentication engine 206, 306, and/or 406 may computationally process the sensor signals against condition profiles stored in the user profiles 217, 317, and/or 417 for individual user's conditions and/or preferences and/or computationally process against condition profiles in the services profiles 219, 319, and/or 419 for conditions that apply to all users or groups of users to determine whether there is substantial correspondence between the sensor signals and the condition profiles.

For example, the individual may provide an acoustic and/or visual cue to the drone authentication system 100 that the user is not going to provide the primary authentication credentials and/or that the user would like to be authenticated by a secondary authentication. In another example, the drone authentication system 100 may recognize that the individual is with another individual and automatically determines that the primary authentication is not appropriate based on the condition profiles of another individual being within a predetermined range of the individual requesting the service due to privacy concerns. In another example, a condition where the drone authentication system determines that the primary authentication is not available may be that the user is unresponsive to the request for primary authentication credentials and is lying on the ground and/or not moving. Lying on the ground motionless may be a condition that distinguishes from an individual that may be simply ignoring the drone authentication system 100 to get to the secondary authentication.

As discussed above, in an embodiment the authentication engine 206, 306 and/or 406 may include machine learning algorithms that may learn, based on conditions in the monitored space 102 and/or actions performed by the individual 805 requiring the service, that the primary authentication method is not attainable given the conditions of the monitored space 102 and/or the actions performed by the individual requiring the service. The authentication engine 206, 306 and/or 406 may be configured with one or more machine learning algorithms to perform supervised machine learning, unsupervised machine learning (e.g., deep belief networks, neural networks, statistical pattern recognition, rule-based artificial intelligence, etc.) semi-supervised learning, reinforcement learning, deep learning, and other machine learning algorithms when updating, creating, and/or reinforcing a condition profile for determining whether to perform a primary authentication or secondary authentication.

If the primary authentication response is attainable, the sub-method 700 may proceed to block 704, where the primary authentication response is received from the individual. The authentication engine 206, 306, and/or 406 may computationally process the sensor signals against sensor signal profiles stored in the user profiles 217, 317, and/or 417 to determine whether there is substantial correspondence between the received primary authentication response and a stored primary authentication response profile. As discussed above, the individual 805 may provide spoken user credentials to the drone authentication system 100 that may be received by the acoustic sensor 115 and/or 117 and computationally processed (e.g., speech recognition and/or voice recognition) against acoustic profiles stored in the user profiles 217, 317, and/or 417. The sub-method 700 may then proceed to block 624 of method 600.

If the primary authentication response is unattainable, then the sub-method 700 proceeds to block 706, where a secondary authentication response to authenticate the individual 805 as an authenticated user is determined. In an embodiment, the service being provided by the drone authentication system 100 may authorize an individual as an authenticated user based on one or more secondary authentications provided by the individual. When there is a plurality of secondary authentication responses for the service as indicated in the service profiles 219, 319, and/or 419, the authentication engine 206, 306, and/or 406 may determine which secondary authentication response or set of secondary authentication responses the authentication engine 206, 306, and/or 406 needs to receive before authenticating an individual as a user. The determination may be based on a priority assigned to each secondary authentication response predefined by the service in the service profile 219, 319, and/or 419, the present conditions in the monitored space 102, the actions of the individual, whether the identity of the individual is known to the drone authentication system 100 already, and/or other criteria used to determine which of one or more secondary authentication responses to obtain.

For example, if the individual 805 is within a predefined range of at least one other individual, such that the spoken user credentials are not appropriate for primary authentication, the authentication engine 206, 306, and/or 406 may determine the identity of the individual through facial recognition as the secondary authentication. In another example, the drone authentication system 100 may already know the identity of the individual 805 because the drone is a "follow-me" drone and/or the drone authentication system 100 has already identified the individual through a first secondary authentication response (e.g., facial recognition). If the drone authentication system 100 already knows the individual 805, the drone authentication system 100 may elicit a second secondary authentication response such as requesting a response to a question that is known to the individual 805. For example, the question may be a preselected security question with a preselected answer stored in the user's user profile (e.g., What is the name of your first pet?). In other examples, the question may be based on information learned from the drone authentication system 100 and/or information received by the drone authentication system 100 from third party data feeds such as information from secured service providers. For example, the drone authentication system 100 may know that you went to a specific movie last week and ask you what movie you went to as the secondary authentication inquiry.

Continuing with the specific example illustrated in FIGS. 8-11, the individual 805 may be unresponsive to the drone 105 and the drone 105 may determine that the unresponsiveness of the individual 805 in addition to the initial determination that caused the drone 105 to enter into the investigate mode of the individual 805 being on the ground substantially correlates with a condition profile indicating that a primary authentication is unattainable. Therefore, because the individual 805 is unresponsive, the drone authentication system 100 may determine that a secondary authentication response is required that includes a biometric authentication to authenticate the individual 805 as a user. For example, the drone authentication system 100 may determine that the secondary authentication technique may be facial recognition, an ocular scan, a fingerprint scan, DNA analysis, and/or other biometric authentication techniques. The drone authentication system 100 may require the secondary authentication response to provide medical treatment to the individual 805. However, if the person is unresponsive, the drone authentication system 100 may be configured to automatically provide a notification to emergency personnel that includes the coordinates of the drone 105 that is within the predefined range of the individual 805 without authentication from the user.

The sub-method 700 then proceeds to block 708, where the drone 105 obtains the secondary authentication response. The drone 105 may obtain sensor signals from sensors that are relevant in authenticating the individual 805 through the secondary authentication technique to verify the individual as a user. The individual 805 may provide to the drone 105 an acoustic response to the question that the drone asked the user. In another example, the imaging sensors 114 may capture an image of the individual 805 In other examples, a biometric sensor 113 associated with the secondary authentication technique may be deployed by the robotic arm 111 of the drone 105 to obtain biometric data and/or biological material needed from the individual 805 to perform the determined secondary authentication.

The sub-method 700 then proceeds to block 710 where authentication is performed. In an embodiment, at block 710 the primary authentication response and/or the secondary authentication response, which includes sensor signals, may be computationally processed by the authentication engine 206, 306, and/or 406 to determine whether the primary authentication response and/or the secondary authentication response substantially corresponds with user credentials that are stored and associated with a user profile 217, 317, and/or 417 in the user repository 216, 316, and/or 416.

Referring back to FIG. 6, the method 600 then proceeds to block 624 where it is determined whether the individual is an authenticated user of the service from the results of the performance of the authentication performed in block 710 of sub-method 700 in FIG. 7. If the individual is an authenticated user, the method 600 may proceed to block 616 where the service is provided to the individual 805. If the authentication fails, then the method 600 may proceed to block 612, where the drone 105 and/or the drone authentication system 100 return to a standby/monitor mode of operation. As illustrated in FIG. 11, once the service is performed in block 616 or the authentication of the individual 805 as a user fails, then the drone 105 returns to the standby/monitoring mode at its original monitoring location.

Figure 12:
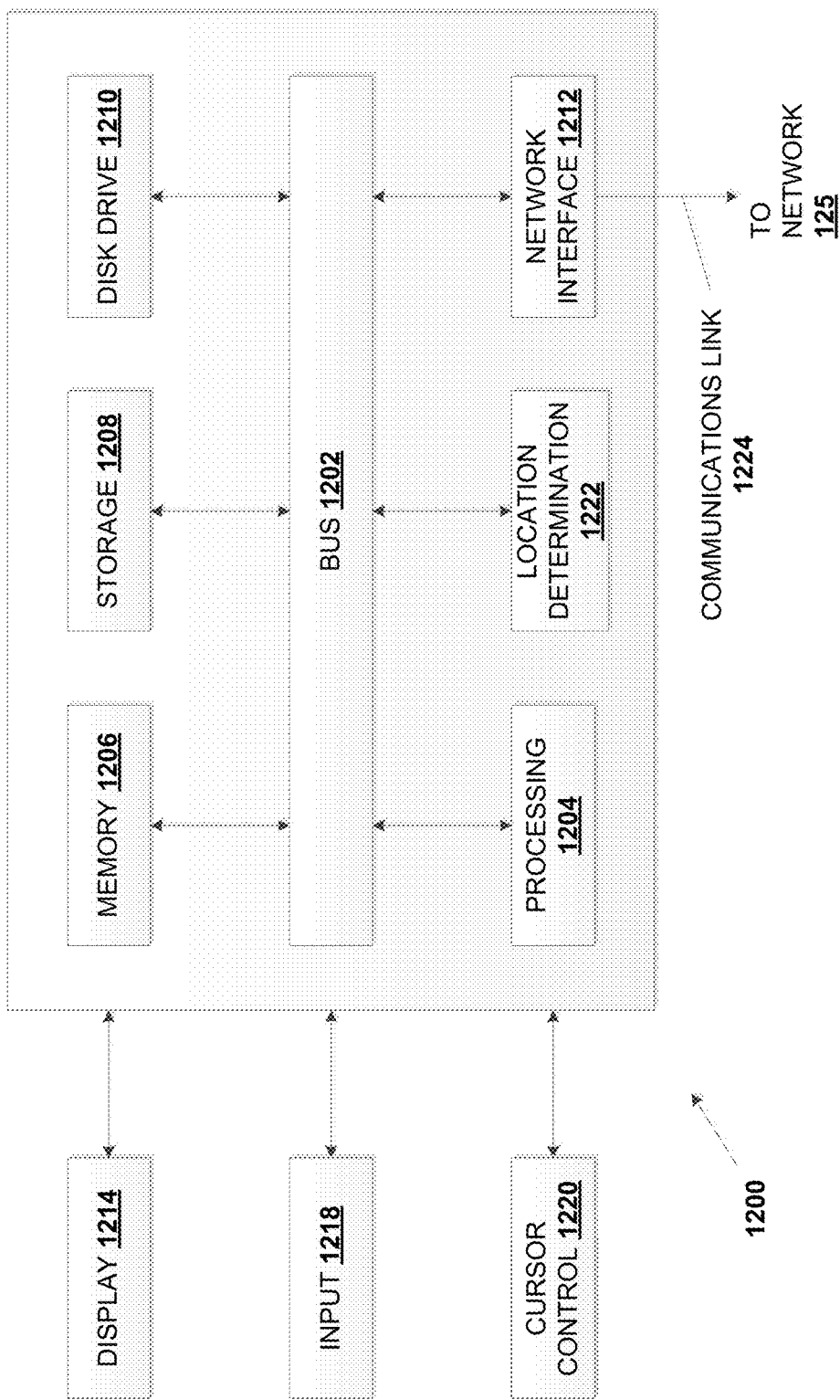
FIG. 12 is a schematic view illustrating an embodiment of a computer system.

Referring now to FIG. 12, an embodiment of a computer system 1200 suitable for implementing, for example, the control of the drones 105 and/or 200, the drone docking stations 110 and/or 300, the remote monitor 120 and/or 500 and the service platforms 130 and/or 400, is illustrated. It should be appreciated that other devices utilized in the drone authentication system 100/800 discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and/or a location determination component 1222 (e.g., a Global Positioning System (GPS) device as illustrated, a cell tower triangulation device, and/or a variety of other location determination devices.) In one implementation, the disk drive component 1210 may comprise a database having one or more disk drive components.

In accordance with embodiments of the present disclosure, the computer system 1200 performs specific operations by the processing component 1204 executing one or more sequences of instructions contained in the system memory component 1206, such as described herein with respect to the drone(s), the drone docking station(s), the service platform, and/or the remote monitor(s). Such instructions may be read into the system memory component 1206 from another computer-readable medium, such as the static storage component 1208 or the disk drive component 1210. In other embodiments, hardwired circuitry may be used in place of or in combination with software instructions to implement the present disclosure.

Logic may be encoded in a computer-readable medium, which may refer to any medium that participates in providing instructions to the processing component 1204 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 1210, volatile media includes dynamic memory, such as the system memory component 1206, and tangible media employed incident to a transmission includes coaxial cables, copper wire, and fiber optics, including wires that comprise the bus 1202 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to a communication network 125 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (e.g., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A method of authentication, the method comprising:
monitoring a monitored space for a condition to provide an interaction between a drone and an individual;
obtaining, by the drone and in response to the condition to provide the interaction between the drone and the individual being satisfied, a first set of sensor data corresponding to the individual;
determining the individual requires a service, based on the first set of sensor data, that requires authentication of the individual as a user of the service and, in response, determining, based on the first set of sensor data, that the individual is unable to provide a primary authentication response;
obtaining, by the drone, a second set of sensor data corresponding to the individual unable to provide the primary authentication response; and determining, based on the second set of sensor data and stored identity data, that the individual is a user of the service and, in response, performing the service.

2. The method of claim 1, wherein the obtaining the second set of sensor data corresponding to the individual unable to provide the primary authentication response is in response to determining the identity of the individual as a user of the service is known and the service requires authentication of the individual regardless of whether the individual is already identified as a user of the service.

3. The method of claim 1, further comprising:
autonomously navigating the drone toward the individual in response to the condition to provide the interaction between the drone and the individual being satisfied; and
initiating an investigate mode of the drone when the drone is within a predetermined range of the individual.

4. The method of claim 1, wherein the primary authentication response is an acoustic credential to be obtained by an acoustic sensor included on the drone.

5. The method of claim 1, further comprising:
deploying a biometric sensor, and wherein the second set of sensor data includes sensor data obtained by the biometric sensor.

6. The method of claim 5, wherein the first set of sensor data does not include sensor data obtained by the biometric sensor.

7. The method of claim 1, further comprising:
determining, based on image sensor data captured by an image sensor and included in the first set of sensor data, one or more sensors for use in obtaining the second set of sensor data corresponding to the individual.

8. An authentication system for use in a monitored space comprising:
a plurality of sensors, wherein the plurality of sensors includes at least an imaging sensor; and
a drone that includes:
at least one communications interface;
at least one non-transitory memory storing identity data associated with one or more users;
one or more processors coupled to the plurality of sensors, communications interface, and non-transitory memory and configured to execute instructions to cause the authentication system to:
monitor a monitored space for a condition to provide an interaction between a drone and an individual;
obtain, in response to the condition to provide the interaction between the drone and the individual being satisfied, a first set of sensor data corresponding to the individual;
determine the individual requires a service based on the first set of sensor data that requires authentication of the individual as a user of the service and, in response, determine, based on the first set of sensor data, that the individual is unable to provide a primary authentication response;
obtain, by the drone, a second set of sensor data corresponding to the individual unable to provide the primary authentication response; and
determine, based on the second set of sensor data and stored identity data, that the individual is a user of the service and, in response, perform the service.

9. The authentication system of claim 8, wherein the obtaining the second set of sensor data corresponding to the individual unable to provide the primary authentication response is in response to determining the identity of the individual is known and the service requires authentication of the individual regardless of whether the individual is already identified.

10. The authentication system of claim 8, wherein the one or more processors are further configured to execute instructions to cause the authentication system to:
autonomously navigate the drone toward the individual in response to the condition to provide the interaction between the drone and the individual being satisfied; and
initiate an investigate mode of the drone when the drone is within a predetermined range of the individual.

11. The authentication system of claim 8, wherein the primary authentication response is an acoustic credential to be obtained by an acoustic sensor included on the drone.

12. The authentication system of claim 8, wherein the plurality of sensors includes a biometric sensor coupled to the one or more processors, and wherein the one or more processors is further configured to execute instructions to cause the authentication system to:
deploy the biometric sensor, and wherein the second set of sensor data includes sensor data obtained by the biometric sensor.

13. The authentication system of claim 12, wherein the first set of sensor data does not include sensor data obtained by the biometric sensor.

14. The authentication system of claim 8, wherein the one or more processors is further configured to execute instructions to cause the authentication system to:
determine, based on image sensor data captured by an image sensor and included in the first set of sensor data, one or more sensors of plurality of sensors for use in obtaining the second set of sensor data corresponding to the individual.

15. A non-transitory machine-readable medium having stored thereon machine-readable instructions executable to cause a machine to perform operations comprising:
monitoring a monitored space for a condition to provide an interaction between a drone and an individual;
obtaining, by the drone and in response to the condition to provide the interaction between the drone and the individual being satisfied, a first set of sensor data corresponding to the individual;
determining the individual requires a service based on the first set of sensor data that requires authentication of the individual as a user of the service and, in response, determining, based on the first set of sensor data, that the individual is unable to provide a primary authentication response;
obtaining, by the drone, a second set of sensor data corresponding to the individual unable to provide the primary authentication response; and
determining, based on the second set of sensor data and stored identity data, that the individual is a user of the service and, in response, performing the service.

16. The non-transitory machine-readable medium of claim 15, wherein the obtaining the second set of sensor data corresponding to the individual unable to provide the primary authentication response is in response to determining the identity of the individual as a user of the service is known and the service requires authentication of the individual regardless of whether the individual is already identified as a user of the service.

17. The non-transitory machine-readable medium of claim 15, wherein the operations further comprise:

autonomously navigating the drone toward the individual in response to the condition to provide the interaction between the drone and the individual being satisfied; and initiating an investigate mode of the drone when the drone is within a predetermined range of the individual.

18. The non-transitory machine-readable medium of claim 15, wherein the primary authentication response is an acoustic credential to be obtained by an acoustic sensor included on the drone.

19. The non-transitory machine-readable medium of claim 15, wherein the operations further comprise:
deploying a biometric sensor, and wherein the second set of sensor data includes sensor data obtained by the biometric sensor.

20. The non-transitory machine-readable medium of claim 15, wherein the operations further comprise:
determining, based on image sensor data captured by an image sensor and included in the first set of sensor data, one or more sensors for use in obtaining the second set of sensor data corresponding to the individual.

* * * * *